(12) United States Patent
Wood et al.

(10) Patent No.: US 10,844,273 B2
(45) Date of Patent: Nov. 24, 2020

(54) CHEMISTRY FOR FINES AND WATER CONTROL

(71) Applicant: COMMONWEALTH SCIENTIFIC AND INDUSTRIAL RESEARCH ORGANISATION, Australian Capital Territory (AU)

(72) Inventors: Colin David Wood, Kensington (AU); Wendy Wenjun Tian, Clayton (AU); Khoa Nguyen Pham, Clayton (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 0 days.

(21) Appl. No.: 16/325,249

(22) PCT Filed: Aug. 16, 2017

(86) PCT No.: PCT/AU2017/050870
§ 371 (c)(1),
(2) Date: Feb. 13, 2019

(87) PCT Pub. No.: WO2018/032051
PCT Pub. Date: Feb. 22, 2018

(65) Prior Publication Data
US 2019/0203102 A1    Jul. 4, 2019

(30) Foreign Application Priority Data

Aug. 16, 2016 (AU) ................................ 2016903251
Mar. 24, 2017 (AU) ................................ 2017901065

(51) Int. Cl.
*C09K 8/57* (2006.01)
*C09K 8/575* (2006.01)

(52) U.S. Cl.
CPC .......... *C09K 8/5755* (2013.01); *C09K 8/5751* (2013.01)

(58) Field of Classification Search
None
See application file for complete search history.

(56) References Cited

U.S. PATENT DOCUMENTS

| | | | |
|---|---|---|---|
| 6,439,309 B1 * | 8/2002 | Matherly | C08G 69/48 166/276 |
| 2010/0147515 A1 * | 6/2010 | Hughes | C09K 8/805 166/271 |
| 2014/0224492 A1 * | 8/2014 | Weaver | C09K 8/506 166/308.1 |

FOREIGN PATENT DOCUMENTS

WO    2013/091023 A2    12/2001

OTHER PUBLICATIONS

International Search Report in international application No. PCT/AU2017/050870, dated Sep. 28, 2017.
(Continued)

*Primary Examiner* — Jeffrey D Washville
(74) *Attorney, Agent, or Firm* — Ladas & Parry LLP

(57) ABSTRACT

A method of controlling sand production in a sandstone reservoir comprising providing (i) an aminosilane and (ii) a polymeric linking agent comprising monomeric units having pendent functional groups selected from the group consisting of carboxylic acids, carboxylic acid esters and amides, wherein a plurality of the pendent functional groups are reacted with the amino group of the aminosilane by a process selected from the group consisting of aminolysis of carboxylic acid ester groups, Mannich reaction between the amino group of the aminosilane and a plurality of at least one of carboxylic acid and amide pendent groups in the presence of an aldehyde activating agent or combination thereof, contacting the aminosilane and polymeric linking
(Continued)

agent with the sandstone reservoir to bond the silane group of the aminosilane with particles of sand and provide agglomeration as a result of covalent bonding of the linking agent with a plurality of aminosilanes.

16 Claims, 5 Drawing Sheets

(56) References Cited

OTHER PUBLICATIONS

Written Opinion of the International Search Autohirty in international application No. PCT/AU2017/050870, dated Sep. 28, 2017.

* cited by examiner

A. Sandstone

CHEMISTRY FOR FINES AND WATER CONTROL

CROSS-REFERENCE

This application is an application under 35 U.S.C. 371 of International Application No. PCT/AU2017/050870 filed on 16 Aug. 2017. This application claims priority from Australian Provisional Patent Application Nos. 2016903251 filed on 16 Aug. 2016 and 2017901065 filed on 24 Mar. 2017, the contents of which should be understood to be incorporated.

TECHNICAL FIELD

The present invention relates to the chemistry for fines fixing and water control in a sandstone reservoir. In particular, the present invention relates to a method for controlling sand production in a sandstone reservoir. The invention also relates to an agglomerated sand composition and a kit for controlling sand production.

BACKGROUND OF INVENTION

Consolidation of particulates in a subterranean formation, such as sand in wellbores, is of particular interest in the oil industry. Significant amounts of the world's remaining hydrocarbons are located in poorly consolidated reservoirs and water production carries these fines into the wellbore. As such, oil production from these reservoirs can often produce unwanted sand with the oil. Unwanted sand production is a major issue that the oil industry faces as it can cause premature failure of downhole and surface equipment, reduce oil productivity, and can even result in well collapse. Approximately 70% of the world's remaining hydrocarbons are located in poorly consolidated reservoirs. In general, oil production from these reservoirs also produces unwanted sand with the oil. The presence of sand which is produced with the oil is undesirable because the sand particles can abrade pumping and other oil producing equipment, clog portions of the wellbore, block tubulars, create downhole cavities and may reduce productivity and can result in well collapse.

Unconsolidated sandstone reservoirs can be highly susceptible to unwanted sand production. This may occur during first flow due to fluid or gas turbulence, when reservoir pressure decreases or when water leakage occurs. Unwanted sand production typically occurs when sand grains from sandstone reservoirs detach from the surface of the wells and are carried into perforations and cracks in the formation. The biggest drawback of unwanted sand production in unconsolidated sandstone reservoirs is the reduction or stoppage of hydrocarbon production.

Siliceous and Carbonate Reservoirs

The two most common types of hydrocarbon reservoirs are siliceous reservoirs and carbonate reservoirs. The requirements to extract hydrocarbons such as oil from these two types of reservoirs are different due to the difference in their lithology.

The two key differences between siliceous (such as sandstone) reservoirs and carbonate reservoir rocks are how they are formed and the higher chemical reactivity of carbonate reservoirs. Large and systematic differences in the porosity-depth and porosity-permeability distributions of siliceous and carbonate are commonly accepted as a basis for separate treatment requirements of carbonate reservoirs for extraction of hydrocarbons.

Carbonate rocks typically have complex texture and pore network due to their formation history. Carbonate reservoirs are heterogeneous in the pores, grains and textures of the rocks. In particular, carbonates are generally of biological origin and are sedimentary rocks which have deposited near clear, shallow and warm waters. The biological origin of carbonates is usually derived from marine organisms, skeletons, algae and corals and is predominantly composed of calcium carbonate. Calcium carbonate is chemically more active compared to siliceous reservoirs.

Additionally, carbonate reservoirs typically have higher complex structures compared to siliceous reservoirs. Carbonate reservoirs have three porosity types: connected porosity (between carbonate grains); vugs (unconnected pores from dissolution of calcite by water during diagenesis which is the alteration of carbonate rock once formed as a result of chemical and physical processes); and fracture porosity caused by stresses following deposition of carbonate rocks. Diagenesis causes formation of flow barriers affecting extraction performance and fractures can cause water breakthrough, gas coning and drilling problems.

These issues in carbonate reservoir structures affect hydrocarbon fluid path and well productivity compared to sandstone reservoirs which typically have less complicated structures.

Another significant difference between siliceous and carbonate reservoirs are that siliceous reservoirs are water-wet. In contrast, carbonate reservoirs are mixed-wet or oil-wet rocks due to aging of the carbonate rock. This causes oil to adhere to the surface of carbonate rocks and it is harder to produce oil from carbonate reservoirs.

Furthermore, unlike sandstone reservoirs, unwanted fines production (such as sand) is typically not an issue for carbonate reservoirs. Rather, the most common issue encountered in carbonate reservoirs is to control water production.

Fines Fixing

Typical methods to reduce the unwanted production of sand can be divided into mechanical or chemical approaches. Mechanical approaches include slotted liners, screens or gravel packs. Chemical approaches include tackifying resins and nanoparticles to agglomerate sand particles which are complex and are usually expensive. In addition, reduction of water production can reduce sand production.

Mechanical approaches such as gravel-packing treatments can be used in hydrocarbon wellbores to reduce the migration of unconsolidated particulates into the wellbore. A typical gravel-packing treatment involves placing a sand control screen in the wellbore and packing the annulus between the screen and the wellbore with the gravel particulates of a specific size designed to prevent the passage of subterranean formation sand. The gravel particulates prevent the formation particulates from obstructing the screen or migrating with the produced hydrocarbons, and the screen acts to prevent the particulates from entering the production tubing.

Typically, chemical approaches for sand agglomeration result in agglomeration of fines to a certain designated size (for example 100-150 μm). When the wellbore becomes unstable due to drawdown effects, these agglomerated particles still maintain their size and strength, and hence their capacity to be trapped behind the sand screens. The permeability of the well may be unchanged but the bore-hole may become bigger and/or non-circular around the screen, however, larger particles which pack up behind the sand screen may still maintain acceptable permeability.

Alternatively, sand particles around the wellbore can be strengthened by 'washing' out the fine grain boundaries and replacing them with chemical resins that "glue" the sand particles together (for example, Halliburton's SandTrap® system). This approach is known as consolidation which significantly reduces the permeability of the wellbore formation and can result in damaging the reservoir. This approach is used when a wellbore is reaching the end of the hydrocarbon lifecycle and the wellbore is close to collapse. Typically, consolidation of fines in a wellbore reduces the permeability to less than 0.5 Darcys which can significantly reduce hydrocarbon production due to reduction of flow.

Recently, a range of different materials have been used to minimize subterranean formation damage related to clay minerals from simple inorganic compounds and polymers, through to complex organic polymers.

The use of inorganic compounds includes salts such as potassium chloride, sodium chloride and 2-methylbutylammonium chloride which stabilize particulates by neutralizing the negative charge on the surface of the particulates. However, this chemical method is only temporary because the ions can be easily displaced by other ions present in the wellbore. Similar problems also occur with the surface modification approach which changes the zeta potential of the particulates. This is because these methods are sensitive to changes in the reservoir environment and also suffer from weak interactions (and short lifespan).

Organic systems include organic compounds, cationic and anionic polymers and neutral polymers. These materials work as ultra-thin tackifying agents or surface-modification agents to coat on to sand particles to hold the subterranean formation particles. The tackiness of these agents between polymer-coated particulates is due to non-covalent interactions resulting from van der Waals interactions. These polymers can also reduce the effective permeability of the reservoir to water and can reduce water permeability compared to oil.

Cationic inorganic polymers have been used for sand agglomeration and are typically based on salts of hydrolysable multivalent metal cations such as zirconium, chromium and aluminium which are hydrolyzed in solution and form polynuclear complexes with high positive charges. These polymers can only be used in a narrow pH range and will precipitate as hydroxide or hydrated metal oxides in alkaline solutions. As such, cationic inorganic polymers are limited in their use due to lack of ability to penetrate into hydrocarbon reservoirs.

Cationic organic polymers have also been used. Cationic organic polymers are usually based on polyquaternary amines and can provide permanent stabilization and are tolerant of carrier fluids. They have been used in matrix acidisation and acid fracturing. However, cationic organic polymers can cause formation damage and their high temperature stability may be an issue.

Further, nanoparticles have been used for sand agglomeration. This approach involves the capture of wellbore particulates as they enter a hydraulic fracture and keeps them away from the wellbore. The nanoparticles are described as inorganic nanocrystals that have very high surface force attractions, and are typically less than 100 nm. The nanoparticles are not soluble but can be used as slurry.

The current chemical technologies discussed above to address unwanted sand production are often short lived, unreliable or highly dependent on a number of factors including salinity or multivalent cation concentration. Further, the environment of the wellbore in sandstone reservoirs are typically harsh as the reservoir can be hot and saline.

As such, there is a need for a more robust chemical treatment method for sand agglomeration that can improve sand retention behind sand screens. This type of technology could also be used to improve proppant treatments.

It would be desirable to provide a robust chemical treatment based on agglomeration technology which maintains flow (by maintaining permeability to water) to maximise sand-free hydrocarbon production rate, agglomerating particles without damaging sandstone reservoirs and to provide an improved alternative to consolidation technologies.

The discussion of the background to the invention is intended to facilitate an understanding of the invention. However, it should be appreciated that the discussion is not an acknowledgement or admission that any of the material referred to was published, known or part of the common general knowledge as at the priority date of the application.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

SUMMARY OF INVENTION

As a result of research into developing methods for sand agglomeration, the present inventors have found that a polymeric linking agent comprising at least two functional groups can be reacted in aqueous media with a silane coupling agent comprising a functional group reactive with the functional groups of the linking agent to form covalent bonds between the polymeric linker and coupling agents and provide effective agglomeration of particles bonded via the silane coupling agent to a siliceous reservoir. In one embodiment the present invention provides a method of controlling sand production in a sandstone reservoir comprising providing (i) a silane coupling agent comprising a further reactive functional group and (ii) a polymeric inking agent wherein the polymeric linking agent comprises at least two functional groups reactive in aqueous media with the further functional group of the silane coupling agent, contacting the silane coupling agent and polymeric linking agent with the sandstone reservoir to bond the silane group with particles of sand and provide agglomeration as a result of covalent bonding of the linking agent with a plurality of coupling agents.

In another embodiment the present invention provides a method of controlling sand production in a sandstone reservoir comprising providing (i) an aminosilane and (ii) a polymeric linking agent comprising monomeric units having pendent functional groups selected from the group consisting of carboxylic acids, carboxylic acid esters and amides, wherein a plurality of the pendent functional groups are reacted with the amino group of the aminosilane by a process selected from the group consisting of aminolysis of carboxylic acid ester groups, Mannich reaction between the amino group of the aminosilane and a plurality of at least one of carboxylic acid and amide pendent groups in the presence of an aldehyde activating agent or combination thereof, contacting the aminosilane and polymeric linking agent with the sandstone reservoir to bond the silane group of the aminosilane with particles of sand and provide agglomeration as a result of covalent bonding of the linking agent with a plurality of aminosilanes.

Advantageously, the method of the present invention provides a chemical agglomeration method which covalently links silane coupled sand particles via a polymeric linker. Additionally, the present invention maintains permeability to water for the resulting agglomerated sand composition. The use of the polymeric linking agent can provide agglomeration in a controlled manner by forming covalent bonds via complementary reactive groups of the linker and aminosilane. The resulting covalent bond formed between the polymeric linking agent and aminosilane is resistant to changes in the reservoir environment (for examples changes in salinity).

Additionally, the use of the aminosilane and polymeric linking agent in the method of the present invention can be used to modify surface chemistry of the sand particles (for example, wettability), stabilising a portion of a wellbore, increasing sand retention of a screen in a wellbore and control permeability of the sandstone reservoir (for example, reducing unwanted water production in hydrocarbon reservoirs).

In one set of embodiments the silane coupling agent is an aminosilane, that is the reactive functional group present in addition to the silane is an amino group, and the polymeric linking agent comprises monomeric units having pendent functional groups selected from the group consisting of carboxylic acids, carboxylic acid esters and amides wherein at least a plurality of the pendent functional groups are reacted with the amine by a process of aminolysis of ester groups, Mannich reaction between the amino group of the aminosilane and a plurality of at least one of carboxylic acid and amide pendent groups in the presence of an aldehyde activating agent or combination thereof, to provide the agglomeration as a result of covalent bonding of the linking agent with a plurality of aminosilanes.

The pendent carboxylic acid ester groups may be formed as an intermediate from pendent carboxylic acids by esterification with a leaving group such as provided by a carbodiimide, optionally in the presence of an alcohol leaving group.

Thus in one preferred embodiment the present invention provides a method wherein the further reactive functional group of the silane coupling agent is an amine and the polymeric linking agent comprises a plurality of monomer units comprising pendent carboxylic acid esters having an alcohol leaving group which activates the esters for aminolysis by the amine of the coupling agent to form an amide bond between the linking agent and a plurality of coupling agents.

In another embodiment, the present invention provides a method wherein (a) the polymeric linking agent comprises a plurality of carboxylic acid monomer units and optionally monomeric units comprising amine functional groups; (b) the further reactive group of the silane coupling agent is an amine, in the presence of an aldehyde activating agent to provide covalent bonding of the amine group of the silane coupling agent as a result of Mannich reaction. In this embodiment the activation to form an iminium ion may be carried out in situ in the sandstone reservoir.

In some embodiments, the present invention provides a method of controlling sand production in a sandstone reservoir comprising providing (i) an aminosilane and (ii) a polymeric linking agent selected from the group consisting of polyacrylamide-poly(acrylic acid), polyvinyl alcohol-poly(acrylic acid), poly(ethylene oxide)-poly(acrylic acid), polyamine-poly(acrylic acid), polyethyleneimine-poly(acrylic acid), polyvinylpyrrolidone-poly(acrylic acid) and combinations thereof comprising a plurality of monomers comprising pendent carboxylic acid esters having an alcohol leaving group which is activated for aminolysis by the amine of the aminosilane; forming the pendent carboxylic acid esters of the polymeric linking agent from a polymeric linking agent comprising carboxylic acid monomers by esterifying the carboxylic acid monomers in the presence of a carbodiimide compound; reacting the aminosilane and polymeric linking agent to form amide bond between the linking agent and a plurality of aminosilane coupling agents; and contacting the aminosilane and polymeric linking agent with the sandstone reservoir to bond the silane group with particles of sand and provide agglomeration as a result of covalent bonding of the linking agent with a plurality of aminosilanes.

The method of the present invention can be used to agglomerate silicon dioxide based formations including sand and sandstone reservoirs and hydrocarbon wells (for example oil or gas wells). The method of the present invention can also increase wellbore lifetime as agglomerating sand particles in a sandstone reservoir can reduce the amount of unconsolidated sand particles produced during oil production in reservoirs.

Advantageously, the method of the present invention is particularly suitable for controlling sand production in offshore sandstone reservoirs as managing unwanted sand production in offshore facilities can be difficult. While unwanted sand production can occur in both offshore and onshore reservoirs, managing unwanted sand production offshore is more difficult. As such, offshore sandstone reservoirs which have been treated with the method of the present invention can reduce costs for oil production and increase efficiency as managing unwanted sand production is minimised.

In yet a further embodiment, the present invention provides an agglomerated sand composition comprising: particles of sand; silane coupling agent bound to the sand particles; a polymeric linking agent covalently bonded to a plurality of silane coupling agents by formation of amide bonds between an amine functional group of the silane coupling agent and a pendent functional group of the polymeric linking agent selected from carboxylic acid and carboxylic acid ester functional groups.

In another embodiment, the present invention provides an agglomerated sand composition comprising: particles of sand; aminosilanes bound to the sand particles; a polymeric linking agent covalently bonded to a plurality of aminosilanes by formation of amide bonds between an amine functional group of the aminosilane and a pendent functional group of the polymeric linking agent selected from carboxylic acid and carboxylic acid ester functional groups.

In yet another embodiment, the present invention provides a kit for controlling sand production in a sandstone reservoir comprising: a silane coupling agent; and a polymeric linking agent comprising a plurality of monomeric units comprising pendent carboxylic acid esters having an alcohol leaving group which is activated for aminolysis by the amine of the coupling agent for formation of amide bonds between the polymeric linking agent and a plurality of silane coupling agents.

In a further embodiment, the present invention provides a kit for controlling sand production in a sandstone reservoir comprising: an aminosilane; and a polymeric linking agent comprising a plurality of monomeric units comprising pendent carboxylic acid esters having an alcohol leaving group which is activated for aminolysis by an amine of the aminosilane for formation of amide bonds between the polymeric linking agent and a plurality of aminosilanes.

Advantageously, the silane coupling agent (such as an aminosilane) and polymeric linking agent can be stable and suitable for long-term storage prior to reacting with each other to form covalent bonding between the linking agent and plurality of coupling agents to provide agglomeration. This allows transport of the kit to remote locations for long-term storage and used as necessary for sandstone reservoirs to control sand production.

DETAILED DESCRIPTION

Figure 1:
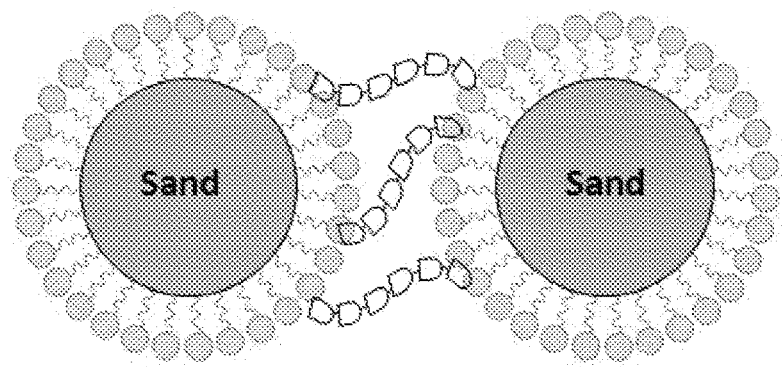
FIG. 1 is an illustration showing the mechanism of agglomeration of sand particles in accordance with embodiments of the present invention. In this Figure (—O) represents silane coupling agent and (-Δ-Δ-) represents polymeric linking agent.

As used herein the term "subterranean formation" refers to areas below exposed earth and areas below earth covered by water such as fresh water and salt water.

As used herein the term "water soluble" refers to at least about 0.01 wt %, alternatively at least about 0.1 wt % or alternatively at least about 1 wt % solubility in distilled water at 25° C.

It is to be understood that the term "consolidation" refers to an interconnected group of objects that form a structure significantly more extensive in size than the individual components from which it is made with a permeability to water less than 0.5 Darcys.

As used herein, the term "agglomeration" refers to an interconnected group of objects that form a structure significantly more extensive in size than the individual components from which it is made. In relation to the present invention, agglomeration refers to the structure formed as a result of covalent bonding of the linking agent with a plurality of coupling agents in conjunction with bonding of the silane group of the silane coupling agent to the particles of sand with a permeability to water greater than 0.5 Darcys.

As used herein, the terms "activated" and "activation" refers to the presence and formation respectively of a leaving group such as the alcohol portion of the ester which alcohol leaving group renders the ester susceptible to nucleophilic substitution by the silane comprising an amino group to form an amide covalent bond with the carbonyl group of the activated ester. Non-limiting examples of activation are formation of an O-acylisourea intermediate from a carboxylic acid, an N-hydroxysuccinimide ester from a carboxylic acid to react with an amine to form an amide bond; or formation of an iminium ion from an amine to react with a carbonyl group to form a covalent bond via a Mannich reaction.

As discussed above, the present invention relates to a method of controlling sand production in a sandstone reservoir comprising providing (i) an aminosilane and (ii) a polymeric linking agent comprising monomeric units having pendent functional groups selected from the group consisting of carboxylic acids, carboxylic acid esters and amides, wherein at least a plurality of the pendent functional groups are reacted with the amino group of the aminosilane by a process of either aminolysis of carboxylic acid ester groups, Mannich reaction between the amino group of the aminosilane and a plurality of at least one of carboxylic acid and amide pendent groups in the presence of an aldehyde activating agent or combination thereof, contacting the aminosilane and polymeric linking agent with the sandstone reservoir to bond the silane group of the aminosilane with particles of sand and provide agglomeration as a result of covalent bonding of the linking agent with a plurality of aminosilanes.

As used herein, the term "sand" refers to silica and silicate sand. It will be understood that the method of the present invention can be used with any siliceous subterranean formation (i.e. silicon dioxide based formations) which can be agglomerated. Suitable subterranean formations include any silicon dioxide based formations such as sand and sandstone reservoirs. The reservoirs include hydrocarbon wellbores such as oil and gas wellbores. Suitable sand materials can be selected from the group consisting of silica sand, graded silica sand, Ottawa sands, Brady sands. Colorado sands, glass, quartz, feldspar and combinations thereof.

The diameter of the sand particle can be of any suitable size for agglomeration. In certain embodiments, the diameter of the sand particle depends on the pore size of the mechanical screens used in the sandstone reservoirs. Typically, pore sizes range from 300 μm to 800 μm. In some embodiments, the well of a sandstone reservoir can collapse when the diameter of the sand particle is greater than 2 mm.

In one embodiment, the diameter of the sand particle is of from 100 nm to 500 μm. In one embodiment, the diameter of the sand particle is of from 100 nm to 100 μm. In one embodiment, the diameter of the sand particle is of from 5 μm to 600 μm. In one embodiment, the diameter of the sand particle is of from 50 μm to 150 μm. In one embodiment, the diameter of the sand particle is of from 10 μm to 600 μm. In one embodiment, the diameter of the sand particle is of from 10 μm to 40 μm. In one embodiment, the diameter of the sand particle is of from 100 μm to 150 μm. In one embodiment, the diameter of the sand particle is of from 400 μm to 600 μm. In one embodiment, the diameter of the sand particle is of from 100 nm to 1000 nm. In one embodiment, the diameter of the sand particle is of from 200 nm to 800 nm. In one embodiment, the diameter of the sand particle is of from 300 nm to 600 nm. In one embodiment, the diameter of the sand particle is of from 100 μm to 1000 μm. In one embodiment, the diameter of the sand particle is of from 5 μm to 2000 μm. In one embodiment, the diameter of the sand particle is of from 300 μm to 800 μm.

Sand can be graded according to ISO 14688 as fine, medium and coarse sand with ranges 0.063 mm to 0.2 mm to 0.63 mm to 2.0 mm in certain embodiments. In addition, in the United States of America, sand is typically divided into five categories based on size: very fine sand (0.0625-0.125 mm diameter), fine sand (0.125 mm-0.25 mm), medium sand (0.25 mm-0.5 mm), coarse sand (0.5 mm-1 mm) and very coarse sand (1 mm-2 mm).

In certain embodiments, the further functional group of the silane coupling agent is an amine and the polymeric linking agent comprises a plurality of monomeric units comprising carboxylic acid ester groups wherein the alcohol portion of the ester provides a leaving group which activates the ester for aminolysis by the amine of the coupling agent to form an amide bond between the linking agent and a plurality of coupling agents.

It is to be understood that the term plurality refers to two or more stated features, integers, steps or components. For example, the polymeric linking agent can comprise two or more pendent functional groups.

In certain embodiments, the pendent carboxylic acid esters comprise an O-acylisourea alcohol leaving group activation which may be provided by esterification of acid groups by reaction with a carbodiimide compound (having the functional group —[N=C=N]—) for aminolysis by the amine of an aminosilane coupling agent to form an amide bond between the linking agent and a plurality of coupling agents. One skilled in the relevant art would understand that the carbodiimide compounds are dehydration agents which activate the carboxylic acid groups for direct reaction with amines to form amide bonds. The O-acylisourea intermediate formed by activation of the carboxylic acid group can be unstable in aqueous solution and may hydrolyse if the intermediate is stored for prolonged periods.

It is to be understood that any suitable carbodiimide compound can be used for aminolysis. In some embodiments, the carbodiimide compound is water soluble. In other embodiments, the carbodiimide compound can be dissolved in any suitable co-solvent that is miscible with water to Improve solubility of the carbodiimide compound. In one embodiment, the co-solvent is selected from the group consisting of acetone, acetonitrile, dimethyl formamide, dimethyl sulfoxide, dioxane, ethanol, isopropyl alcohol, methanol, tetrahydrofuran and combinations thereof.

Suitable carbodiimide compounds can be selected from the group consisting of 1-ethyl-3-(3-dimethylaminopropyl) carbodiimide hydrochloride (EDC), 1-[3-(dimethylamino) propyl]-3-ethylcarbodiimide methiodide (EDC-methiodide), N-cyclohexyl-N'-(2-morpholinoethyl)carbodiimide (CMC), 1-tert-butyl-3-ethylcarbodiimide. N,N'-di-tert-butylcarbodiimide, dicyclohexylcarbodiimide (DCC), N,N'-diisopropylcarbodiimide (DIC), N-(3-dimethylaminopropyl)-N'-ethylcarbodiimide, 1,3-di-p-tolylcarbodiimide, phenyl ethyl carbodiimide (PEC), and phenyl isopropyl carbodiimide (PIC) and combinations thereof.

In some embodiments, the polymeric linking may comprise stable pendent carboxylic acid esters formed by adding a carbodiimide compound, such as those described above, to a polymeric linking agent comprising monomeric units comprising carboxylic acid functional groups in combination with an alcohol activating agent to provide the alcohol leaving group adapted to activate the ester for aminolysis by an amine reactive functional group of an aminosilane coupling agent. One skilled in the relevant art would understand that the activating agent for forming a stable esterified acid monomer can be any suitable compound which forms a reactive leaving group for aminolysis which can be isolated. Suitable activating agents are selected from the group consisting of N-hydroxysuccinimide (NHS), pentafluorophenol, N-hydroxysulfosuccinimide (Sulfo-NHS), hydroxybenzotriazole (HOBt), 1-hydroxy-7-azabenzotriazole (HOAt), 1-[bis (dimethylamino)methylene]-1H-1,2,3-triazolo[4,5-b]pyridinium 3-oxide hexafluorophosphate (HATU), (2-(1H-benzotriazol-1-yl)-1,1,3,3-tetramethyluronium hexafluorophosphate) (HBTU), (benzotriazol-1-yloxy)tris(dimethylamino)phosphonium hexafluorophosphate (BOP), (benzotriazol-1-yloxy)tripyrrolidinophosphonium hexafluorophosphate (PyBOP), (7-azabenzotriazol-1-yloxy) tripyrrolidinophosphonium hexafluorophosphate (PyAOP) and combinations thereof.

In certain embodiments, the leaving group formed using an activating agent is selected from the group consisting of

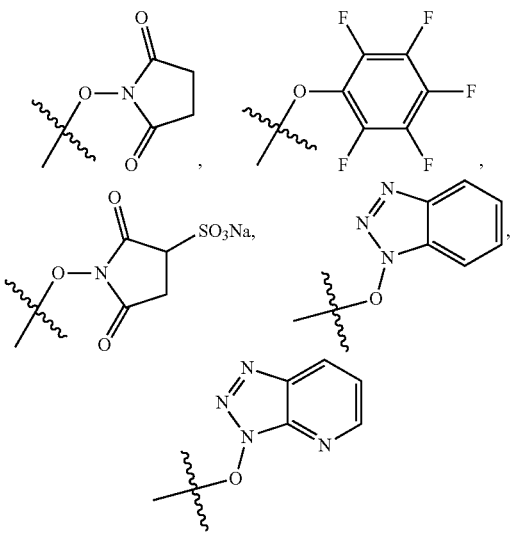

and combinations thereof. Advantageously, these leaving groups are stable and can be isolated if desired.

One skilled in the relevant art would understand that any water soluble polymeric linking agent can be used for agglomerating sand particles. In certain embodiments, the polymeric linking agent comprises a plurality of monomeric units comprising pendent esterified carboxylic acids. Examples of suitable monomers for the polymeric linking agent include polymers of acrylate and methacrylate monomers esterified with the leaving groups activated for aminolysis with an aminosilane coupling agent. In certain embodiments, the polymeric linking agent is a polymer comprising a plurality of acid monomers selected from acrylic acid, methacrylic acid and combinations thereof. In certain embodiments, the polymeric linking agent is a polymer wherein the plurality of monomers are selected from acrylic acid, methacrylic acid, acrylamide and combinations thereof. One skilled in the relevant art would understand that the acrylamide monomer can include hydrolysed acrylamide, cationic acrylamide, anionic acrylamide, amphoteric acrylamide and combinations thereof. In one embodiment, the polymeric linking agent is a polymer selected from the group consisting of poly(acrylic acid), polyacrylamide, poly (methacrylic acid) and combinations thereof.

In some embodiments, the polymeric linking agent is a copolymer of at least one acid monomer selected from acrylic acid and methacrylic acid and a comonomer selected from the group consisting of acrylamide, olefins, vinyl alcohol, ethylene oxide, ethyleneimine and N-vinylpyrrolidone, wherein at least a portion of the acid monomers is esterified with the leaving group. Suitable copolymers can be selected from the group consisting of polyacrylamide-poly(acrylic acid), polyacrylamide-poly(acrylic acid) sodium salt, polyvinyl alcohol-poly(acrylic acid), poly(ethylene oxide)-poly(acrylic acid), polyamine-poly(acrylic acid), polyethyleneimine-poly(acrylic acid), polyvinylpyrrolidone-poly(acrylic acid) and combinations thereof, wherein a plurality of the acid monomers are the esterified acid monomers. In one embodiment, the polymeric linking agent is polyacrylamide-poly(acrylic acid), wherein the plurality of esterified acid monomers are provided by esterified acrylic acid monomers.

In one embodiment, the polymeric linking agent comprises a plurality of the group having the formula

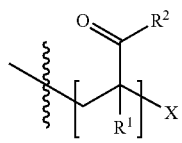

wherein $R^1$ is independently H or $C_1$ to $C_4$ alkyl; $R^2$ is the leaving group; and X is H, Br, $N_3$, $CS_3C_{12}H_{25}$, SH or balance of polymer.

In one embodiment, the polymeric linking agent can be dissolved in any suitable co-solvent that is miscible with water to improve solubility of the polymeric linking agent. In one embodiment, the co-solvent is selected from the group consisting of acetone, acetonitrile, dimethyl formamide, dimethyl sulfoxide, dioxane, ethanol, isopropyl alcohol, methanol, tetrahydrofuran and combinations thereof.

It can be desirable to include a preactivation step to form esterified acid monomers from a polyacid polymeric linking agent. Advantageously, the preactivation step can provide a polymeric linking agent having a plurality of esterified acid monomers which can be isolated and stored for later use and transport. The preactivating step may comprise esterifying a polymeric linking agent having acid monomers by reacting the polymeric linking agent with an activating agent to form a plurality of esterified acid monomers.

As discussed above, any suitable activating agent may be used for esterification of acid monomers to provide an alcohol leaving group which activates the ester for nucleophilic substitution by the amino group of an aminosilane to form an amide covalent bond. Suitable activating agents can be selected from the group consisting of N-hydroxysuccinimide (NHS), pentafluorophenol, N-hydroxysulfosuccinimide (Sulfo-NHS), hydroxybenzotriazole (HOBt), 1-hydroxy-7-azabenzotriazole (HOAt), 1-[bis(dimethylamino)methylene]-1H-1,2,3-triazolo[4,5-b]pyridinium 3-oxid hexafluorophosphate (HATU), (2-(1H-benzotriazol-1-yl)-1,1,3,3-tetramethyturonium hexafluorophosphate) (HBTU), (benzotriazol-1-yloxy)tris(dimethylamino)phosphonium hexafluorophosphate (BOP), (benzotriazol-1-yloxy)tripyrrolidinophosphonium hexafluorophosphate (PyBOP), (7-azabenzotriazol-1-yloxy)tripyrrolidinophosphonium hexafluorophosphate (PyAOP) and combinations thereof.

In other embodiments, the polymeric linking agent is activated to provide the plurality of esterified acid monomers in situ. It can be desirable to activate the polymeric linking agent to form the esterified acid monomers with a leaving group for aminolysis in a one-pot process. Advantageously, this can reduce labour costs by minimising additional steps as agglomeration of the sand particles in a sandstone reservoir can be carried out by providing a silane coupling agent, a polymeric linking agent, a carbodiimide compound and optionally an activating agent to the reservoir in a single step. In certain embodiments, the agglomeration of the sand particles in a sandstone reservoir can be carried out by providing a silane coupling agent, a polymeric linking agent, a carbodiimide compound and an activating agent to the reservoir in a single step.

In another set of embodiments, the invention provides (a) a polymeric linking agent comprising a plurality of monomeric units comprising a monomeric unit comprising a pendent acid, a monomeric unit comprising an amine and combinations thereof; (b) the further reactive group of the silane coupling agent is an amine, and wherein at least one of the polymeric linking agent or silane coupling agent is activated to provide an iminium ion for agglomeration via a Mannich reaction. Advantageously, the Mannich reaction provides activation of the complementary functional group of the silane coupling agent, wherein the complementary functional group is an amine.

In one embodiment, the iminium ion can be prepared by contacting a polymeric linking agent, silane coupling agent and combinations thereof comprising an amine with an aldehyde. In certain embodiments, the aldehyde is formaldehyde.

In certain embodiments, the polymeric linking agent is a polymer wherein the plurality of monomers is selected from acrylic acid, methacrylic acid, acrylamide and combinations thereof. One skilled in the relevant art would understand that the acrylamide monomer can include hydrolysed acrylamide, cationic acrylamide, anionic acrylamide, amphoteric acrylamide and combinations thereof. In one embodiment, the polymeric linking agent is a polymer selected from the group consisting of poly(acrylic acid), polyacrylamide, poly(methacrylic acid) and combinations thereof.

In some embodiments, the polymeric linking agent is a copolymer of at least one acid monomer selected from acrylic acid and methacrylic acid and a comonomer selected from the group consisting of acrylamide, olefins, vinyl alcohol, ethylene oxide, ethyleneimine, N-vinylpyrrolidone and combinations thereof. In one embodiment, the polymeric linking agent is a copolymer selected from the group consisting of polyacrylamide-poly(acrylic acid), polyacrylamide-poly(acrylic acid), polyacrylamide-poly(acrylic acid) sodium salt, poly(acrylic acid)-poly(maleic acid), polyvinyl alcohol-poly(acrylic acid), poly(ethylene oxide)-poly(acrylic acid), polyamine-poly(acrylic acid), polyethyleneimine-poly(acrylic acid), polyvinylpyrrolidone-poly(acrylic acid) and combinations thereof.

In one embodiment, the polymeric linking agent comprises a plurality of the group having the formula

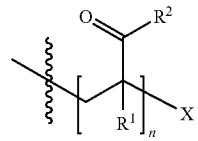

wherein n is an integer selected from 100 to 1000000; $R^1$ is independently H or C, to $C_4$ alkyl; $R^2$ is independently OH, $NH_2$ or a leaving group; X is H, Br, N, $CS_3C_{12}H_{25}$, SH or balance of polymer. In one embodiment, n is an integer selected from 1000 to 10000.

In one embodiment, the polymeric linking agent comprising a plurality of acid groups can be covalently bonded to the silane coupling agent comprising an amine via a Mannich reaction in the presence of aldehyde as shown in Scheme (I). It is to be understood that the silane coupling agent can be covalently bound to the sand particles of the sandstone reservoir before the silane coupling agent is bonded to the polymeric linking agent.

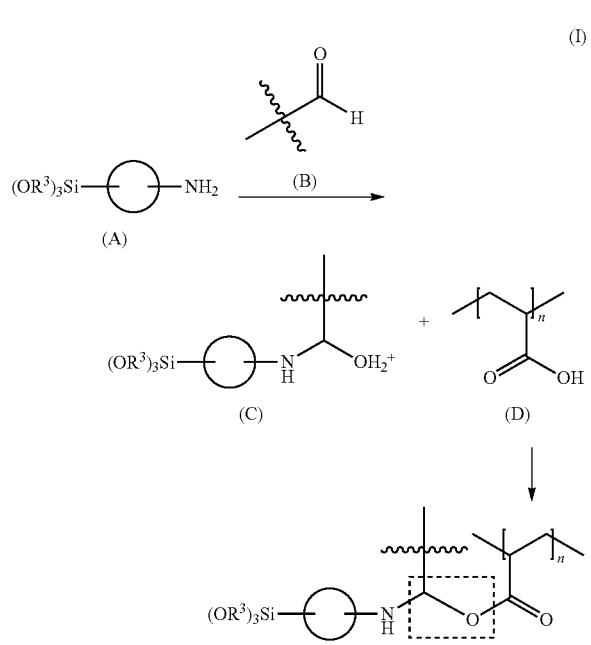

As shown in Scheme (I), a representative aminosilane (A) is reacted with a representative aldehyde (B), preferably formaldehyde, to form an iminium ion (C) which is then reacted with a polymeric linking agent comprising a plurality of acid groups (D) to form a representative covalent bond (highlighted). Each $R^3$ is independently H, $C_1$-$C_8$ alkyl (preferably $C_1$-$C_2$ alkyl) or —Si—.

In embodiments in which the polymeric linker comprises monomeric units comprising pendent acrylamide groups the Mannich reaction can be used to cross-link a plurality of acrylamide monomers. In some embodiments, the cross-linking can be intramolecular, intermolecular and combinations thereof. Intermolecular cross-linking may assist by providing a network of polymeric linkers including a multiplicity of covalently bonded silane coupling agents. Advantageously, the degree of cross-linking can be used to change the permeability of the agglomerated sand composition. In one embodiment, the cross-linking can be provided as follows in Scheme (II):

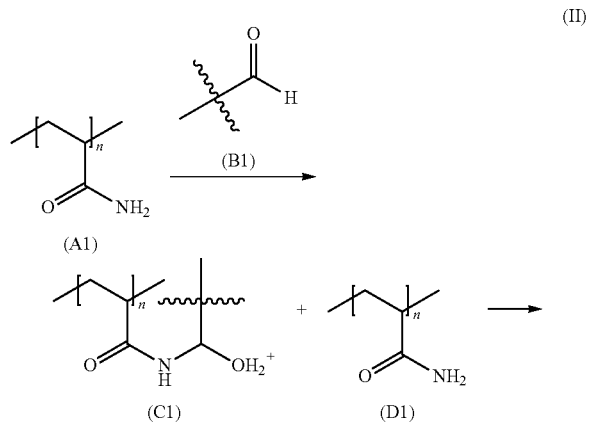

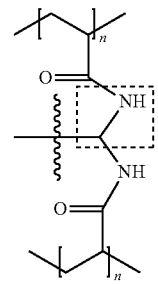

As shown in the Scheme (II), a representative acrylamide (A1) is reacted with a representative aldehyde (B1) to form an iminium ion (C1) which is then reacted with a further acrylamide (D1) to form a representative covalent bond (highlighted).

In some embodiments, the polymeric linking agent has a weight average molecular weight of 20000 to 1000000 Daltons. In some embodiments, the weight average molecular weight is of from 20000 to 600000 Daltons. In some embodiments, the weight average molecular weight is of from 50000 to 600000 Daltons. In some embodiments, the weight average molecular weight is of from 100000 to 600000 Daltons. In some embodiments, the weight average molecular weight is of from 500000 to 550000 Daltons. In some embodiments, the weight average molecular weight is 520000 Daltons. In some embodiments, the weight average molecular weight is of from 50000 to 150000 Daltons. In some embodiments, the number average molecular weight is of from 100000 to 200000 Daltons.

Advantageously, in certain embodiments wherein the polymeric linking agent has a weight average molecular of greater than 20000 Daltons, the agglomerated sand compositions have a higher permeability to water compared to consolidation techniques. Without wishing to be bound by any one theory, it is believed that the higher permeability to water is a result of the increased spacing between individual sand particles which are covalently attached using the longer polymeric linking agents which is associated with higher molecular weight polymeric linking agents.

One skilled in the relevant art would understand that the polymeric linking agent can comprise any suitable amount of acid monomers for activation. In one embodiment, the polymeric linking agent comprises 20 mol % of acid monomers or less. In one embodiment, the polymeric linking agent comprises at least 1 to 10 mol % of acid monomers. In one embodiment, the polymeric linking agent comprises at least 1 to 5 mol % of acid monomers.

One skilled in the relevant art would also understand that the polymeric linking agent can comprise any suitable amount of monomers comprising an amine for activation. In one embodiment, the polymeric linking agent comprises 80 mol % of amine or less. In one embodiment, the polymeric linking agent comprises at least 10 to 80 mol % of amine. In one embodiment, the polymeric linking agent comprises at least 1 to 10 mol % of amine. In one embodiment, the polymeric linking agent comprises at least 50 to 90 mol % of amine. In one embodiment, the polymeric linking agent comprises at least 70 to 90 mol % of amine. In one embodiment, the polymeric linking agent comprises 80 mot % of amine. In one embodiment, the polymeric linking agent comprises at least 1 to 5 mol % of amine.

In one embodiment, the polymeric linking agent comprises of from 20 to 90 wt % acrylamide. In one embodiment, the polymeric linking agent comprises of from 50 to 90 wt % acrylamide. In one embodiment, the polymeric linking agent comprises of from 60 to 90 wt % acrylamide. In one embodiment, the polymeric linking agent comprises of from 70 to 90 wt % acrylamide. In one embodiment, the polymeric linking agent comprises 80 wt % acrylamide.

It is to be understood that the polymeric linking agent can be activated to any suitable degree for agglomeration. In one embodiment, the polymeric linking agent is activated with a leaving group of 20 mol % or less. In one embodiment, the polymeric linking agent is activated with a leaving group of from 1 to 20 mol %. In one embodiment, the polymeric linking agent is activated with a leaving group of from 1 to 10 mol %. In one embodiment, the polymeric linking agent is activated with a leaving group of from 1 to 5 mol %.

In certain embodiments of the present invention, it can be undesirable to activate the polymeric linking agent with leaving groups greater than 20 mol %. In some embodiments, if the polymeric linking agent is activated greater than 20 mol % after the polymeric linking agent is covalently bonded to the silane coupling agent, gelation of the polymeric linking agent can occur due to reaction of the silane groups. In some embodiments, the polymeric linking agent reacts with the sand particles and optionally can involve intermolecular reaction between polymeric linking agents and each polymeric linking agent may also bond to the sand particles.

It is to be understood that the silane coupling agent can be activated to any suitable degree for agglomeration. In one embodiment, the silane coupling agent is activated to provide an iminium ion of 20 mol % or less. In one embodiment, the silane coupling agent is activated to provide an iminium ion of from 1 to 20 mol %. In one embodiment, the silane coupling agent is activated to provide an iminium ion of from 1 to 10 mol %. In one embodiment, the silane coupling agent is activated to provide an iminium ion of from 1 to 5 mol %.

In one embodiment, the silane coupling agent is activated to provide the iminium ion in situ. Advantageously, this can reduce labour costs by minimising additional steps as agglomeration of the sand particles in a sandstone reservoir can be carried out by providing a silane coupling agent, a polymeric linking agent, and an aldehyde in a single step.

It should be understood that the polymeric linking agent and silane coupling agent can be added to each other for agglomeration of sand particles in any order, sequentially or simultaneously to the sandstone reservoir. In one embodiment, the silane coupling agent is added to the sand particles followed by addition of the polymeric linking agent to provide agglomeration as a result of covalent bonding of the linking agent with a plurality of coupling agents. In one embodiment, a mixture of the silane coupling agent and polymeric linking agent is added to the sand particles to provide agglomeration as a result of covalent bonding of the linking agent with a plurality of coupling agents. In one embodiment, the polymeric linking agent is added to the sand particles followed by addition of the silane coupling agent to provide agglomeration as a result of covalent bonding of the linking agent with a plurality of coupling agents.

One skilled in the relevant art would understand that any suitable silane coupling agent can be used for agglomerating sand particles. In one embodiment, the silane coupling agent is water soluble. In some embodiments, the silane coupling agent can modify the surface chemistry of the sand particle (for example wettability) which can minimise unwanted absorption of the reservoir treatments. In one embodiment, the silane coupling agent can be dissolved in any suitable co-solvent that is miscible with water to improve solubility of the silane coupling agent. In one embodiment, the co-solvent is selected from the group consisting of acetone, acetonitrile, dimethyl formamide, dimethyl sulfoxide, dioxane, ethanol, isopropyl alcohol, methanol, tetrahydrofuran and combinations thereof.

In some embodiments, the silane coupling agent is an aminotrialkoxysilane. In some embodiments, the silane coupling agent is selected from the group consisting of N2-(aminoethyl)-3-aminopropyltnmethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, N-beta-(aminoethyl)-r-aminopropyltrimethoxysilane. N-beta-(aminoethyl)-r-aminopropylmethyldimethoxysilane, r-aminopropyltriethoxysilane, N-[3-(trimethoxysilyl)propyl]-ethylenediamine and combinations thereof.

In some embodiments, the silane coupling agent is selected from the group consisting of (3-aminopropyl) trimethoxysilane, (3-aminopropyl)triethoxysilane, (3-aminopropyl)-diethoxy-methylsilane, (3-aminopropyl)-dimethyl-ethoxysilane, (3-glycidoxypropyl)-dimethyl-ethoxysilane, (3-mercaptopropyl)-trimethoxysilane, (3-mercaptopropyl)-methyl-dimethoxysilane, (3-glycidyloxypropyl)trimethoxysilane, N1-(2-aminoethyl)-3-aminopropyltrimethoxysilane and combinations thereof. In one embodiment, the silane coupling agent is (3-aminopropyl)triethoxysilane.

It is to be understood that the concentration of the polymeric linking agent and silane coupling agent in aqueous media depends on the surface area of the sand particle to be agglomerated. Without wishing to be bound by any one theory, the surface area of sand particle is proportional to the diameter of the sand particle. In embodiments where the surface area is high, a skilled addressee would understand that the concentration of the polymeric linking agent and silane coupling agent in aqueous media would increase. The total volume of aqueous media added would be dependent on the pore volume of the reservoir and the area to be treated.

As discussed above, the solution of the polymeric linking agent in aqueous media can be any suitable concentration. Indeed the concentration of the polymeric linking agent will be determined based on the degree of activation of the linking agent. In certain embodiments, the polymeric linking agent is in an amount of from 0.01 wt % to 15 wt % in aqueous media. In certain embodiments, the polymeric linking agent is in an amount of from 0.01 wt % to 10 wt % in aqueous media. In certain embodiments, the polymeric linking agent is in an amount of from 0.01 wt % to 5 wt % in aqueous media. In certain embodiments, the polymeric linking agent is in an amount of from 0.01 wt % to 3 wt % in aqueous media. In certain embodiments, the polymeric linking agent is in an amount of from 0.01 wt % to 2 wt % in aqueous media. In certain embodiments, the polymeric linking agent is in an amount of from 0.1 wt % to 2 wt % W in aqueous media. Suitable aqueous media to dissolve the polymeric linking agent include fresh water, salt water, brine or seawater.

Similarly, the solution of the silane coupling agent in aqueous media can be any suitable concentration. Indeed the concentration of the silane coupling agent will be determined based on the degree of activation of the coupling agent. In certain embodiments, the silane coupling agent is in an amount of from 0.01 wt % to 15 wt % in aqueous media. In certain embodiments, the silane coupling agent is in an amount of from 0.01 wt % to 12 wt % in aqueous media. In certain embodiments, the silane coupling agent is in an amount of from 0.1 wt % to 10 wt % in aqueous media. In certain embodiments, the silane coupling agent is in an amount of from 0.5 wt % to 10 wt % in aqueous media. In certain embodiments, the silane coupling agent is in an amount of from 1 wt % to 10 wt % in aqueous media. In certain embodiments, the silane coupling agent is in an amount of from 3 wt % to 8 wt % in aqueous media. In certain embodiments, the silane coupling agent is in an amount of from 5 wt % to 10 wt % in aqueous media. Suitable aqueous media to dissolve the silane coupling agent include fresh water, salt water, brine or seawater.

The kit can comprise the polymeric linking agent in any suitable amount. In one embodiment, the kit comprises the polymeric linking agent in an amount of at least 10 wt %. In one embodiment, the kit comprises the polymeric linking agent in an amount of at least 20 wt %. In one embodiment, the kit comprises the polymeric linking agent in an amount of at least 30 wt %. In one embodiment, the kit comprises the polymeric linking agent in an amount of at least 50 wt %. In one embodiment, the kit comprises the polymeric linking agent in an amount of at least 70 wt %. In one embodiment, the kit comprises the polymeric linking agent in an amount of at least 80 wt %. In one embodiment, the kit comprises the polymeric linking agent in an amount of at least 90 wt %. In one embodiment, the kit comprises the polymeric linking agent in an amount of from 10 to 90 wt %. In one embodiment, the kit comprises the polymeric linking agent in an amount of from 30 to 90 wt %. In one embodiment, the kit comprises the polymeric linking agent in an amount of from 50 to 80 wt %.

The agglomerated sand composition can comprise reacting the polymeric linking agent in any suitable amount. In one embodiment, the agglomerated sand composition comprises reacting the polymeric linking agent in an amount of at least 10 wt %. In one embodiment, the agglomerated sand composition comprises reacting the polymeric linking agent in an amount of at least 20 wt %. In one embodiment, the agglomerated sand composition comprises reacting the polymeric linking agent in an amount of at least 30 wt %. In one embodiment, the agglomerated sand composition comprises reacting the polymeric linking agent in an amount of at least 50 wt %. In one embodiment, the agglomerated sand composition comprises reacting the polymeric linking agent in an amount of at least 70 wt %. In one embodiment, the agglomerated sand composition comprises reacting the polymeric linking agent in an amount of at least 80 wt %. In one embodiment, the agglomerated sand composition comprises reacting the polymeric linking agent in an amount of at least 90 wt %. In one embodiment, the agglomerated sand composition comprises reacting the polymeric linking agent in an amount of from 10 to 90 wt %. In one embodiment, the agglomerated sand composition comprises reacting the polymeric linking agent in an amount of from 30 to 90 wt %. In one embodiment, the agglomerated sand composition comprises reacting the polymeric linking agent in an amount of from 50 to 80 wt %.

The kit can comprise the silane coupling agent in any suitable amount. In one embodiment, the kit comprises the silane coupling agent in an amount of at least 10 wt %. In one embodiment, the kit comprises the silane coupling agent in an amount of at least 20 wt %. In one embodiment, the kit comprises the silane coupling agent in an amount of at least 30 wt %. In one embodiment, the kit comprises the silane coupling agent in an amount of at least 50 wt %. In one embodiment, the kit comprises the silane coupling agent in an amount of at least 70 wt %. In one embodiment, the kit comprises the silane coupling agent in an amount of at least 80 wt %. In one embodiment, the kit comprises the silane coupling agent in an amount of at least 90 wt %. In one embodiment, the kit comprises the silane coupling agent in an amount of from 10 to 90 wt %. In one embodiment, the kit comprises the silane coupling agent in an amount of from 30 to 90 wt %. In one embodiment, the kit comprises the silane coupling agent in an amount of from 50 to 80 wt %.

The agglomerated sand composition can comprise reacting the silane coupling agent in any suitable amount. In one embodiment, the agglomerated sand composition comprises reacting the silane coupling agent in an amount of at least 10 wt %. In one embodiment, the agglomerated sand composition comprises reacting the silane coupling agent in an amount of at least 20 wt %. In one embodiment, the agglomerated sand composition comprises reacting the silane coupling agent in an amount of at least 30 wt %. In one embodiment, the agglomerated sand composition comprises reacting the silane coupling agent in an amount of at least 50 wt %. In one embodiment, the agglomerated sand composition comprises reacting the silane coupling agent in an amount of at least 70 wt %. In one embodiment, the agglomerated sand composition comprises reacting the silane coupling agent in an amount of at least 80 wt %. In one embodiment, the agglomerated sand composition comprises reacting the silane coupling agent in an amount of at least 90 wt %. In one embodiment, the agglomerated sand composition comprises reacting the silane coupling agent in an amount of from 10 to 90 wt %. In one embodiment, the agglomerated sand composition comprises reacting the silane coupling agent in an amount of from 30 to 90 wt %. In one embodiment, the agglomerated sand composition comprises reacting the silane coupling agent in an amount of from 50 to 80 wt %.

While the discussion above has focussed on the concentrations and amounts of the polymeric linking agents and silane coupling agents suitable for agglomerating sand particles, a skilled addressee will readily appreciate that the molar ratio can be important.

In certain embodiments, the molar ratio of the carboxylic acid monomers to aminosilane is 1:1 to 1:10. In one embodiment, the molar ratio of carboxylic acid monomers to aminosilane is 1:1 to 1:8. In one embodiment, the molar ratio of carboxylic acid monomers to aminosilane is 1:1 to 1:6. In one embodiment, the molar ratio of carboxylic acid monomers to aminosilane to amine is 1:1 to 1:4. In one embodiment, the molar ratio of carboxylic acid monomers to aminosilane is 1:1 to 1:2.

In certain embodiments, the molar ratio of the pendent carboxylic acid ester to aminosilane is 1:1 to 1:10. In one embodiment, the molar ratio of pendent carboxylic acid ester to aminosilane is 1:1 to 1:8. In one embodiment, the molar ratio of pendent carboxylic acid ester to aminosilane is 1:1 to 1:6. In one embodiment, the molar ratio of pendent carboxylic acid ester to aminosilane to amine is 1:1 to 1:4. In one embodiment, the molar ratio of pendent carboxylic acid ester to aminosilane is 1:1 to 1:2.

In certain embodiments, the molar ratio of the pendent functional group to aminosilane is 1:1 to 1:10. In one embodiment, the molar ratio of pendent functional group to aminosilane is 1:1 to 1:8. In one embodiment, the molar ratio of pendent functional group to aminosilane is 1:1 to 1:6. In one embodiment, the molar ratio of pendent functional group to aminosilane to amine is 1:1 to 1:4. In one embodiment, the molar ratio of pendent functional group to aminosilane is 1:1 to 1:2.

In certain embodiments, the molar ratio of the monomers to iminium ion is 1:1 to 1:10. In one embodiment, the molar ratio of the monomers to minimum ion is 1:1 to 1:8. In one embodiment, the molar ratio of the monomers to iminium ion is 1:1 to 1:6. In one embodiment, the molar ratio of the monomers to iminium ion is 1:1 to 1:4. In one embodiment, the molar ratio of the monomers to iminium ion is 1:1 to 1:2.

In certain embodiments, the molar ratio of the silane coupling agent to polymeric linking agent can be any suitable amount for agglomerating sand particles. Advantageously, the amount of polymeric linking agent used compared to the silane coupling agent s low which reduces the likelihood of gelation in contrast to consolidation techniques as discussed above. This can assist in maximising sand-free hydrocarbon production rate in sandstone reservoirs while maintaining flow.

In certain embodiments, the molar ratio of the silane coupling agent to polymeric linking agent is 150:1 to 30000:1. In certain embodiments, the molar ratio of the silane coupling agent to polymeric linking agent is 150:1 to 25000:1. In certain embodiments, the molar ratio of the silane coupling agent to polymeric linking agent is 4000:1 to 30000:1. In certain embodiments, the molar ratio of the silane coupling agent to polymeric linking agent is 4000:1 to 15000:1. In certain embodiments, the molar ratio of the silane coupling agent to polymeric linking agent is 4000:1 to 12000:1. In certain embodiments, the molar ratio of the silane coupling agent to polymeric linking agent is 20000:1 to 30000:1. In certain embodiments, the molar ratio of the silane coupling agent to polymeric linking agent is 150:1 to 1000:1.

The step of contacting the silane coupling agent with the reservoir to bond the silane functional group with the sand particles can occur at any suitable temperature. In certain embodiments, the step of contacting the silane coupling agent with the reservoir is at a temperature greater than 50° C. In certain embodiments, the step of contacting the silane coupling agent with the reservoir is at a temperature of 10 to 100° C. In certain embodiments, the step of contacting the silane coupling agent with the reservoir is at a temperature of 20 to 90° C. In certain embodiments, the step of contacting the silane coupling agent with the reservoir is at a temperature of 30 to 90° C. In certain embodiments, the step of contacting the silane coupling agent with the reservoir is at a temperature of 40 to 90° C. In certain embodiments, the step of contacting the silane coupling agent with the reservoir is at a temperature of 50 to 90° C. In certain embodiments, the step of contacting the silane coupling agent with the reservoir is at a temperature of 50 to 80° C. In certain embodiments, the step of contacting the silane coupling agent with the reservoir is at a temperature of 50 to 70° C.

The step of contacting the silane coupling agent with the polymeric linking agent to form a covalent bond between the polymeric linking agent to a plurality of coupling agents can occur at any suitable temperature. In certain embodiments, the step of contacting the silane coupling agent with the polymeric linking agent is at a temperature greater than 0° C. In certain embodiments, the step of contacting the silane coupling agent with the polymeric linking agent is at a temperature of 10 to 80° C. In certain embodiments, the step of contacting the silane coupling agent with the polymeric linking agent is at a temperature of 10 to 60° C. In certain embodiments, the step of contacting the silane coupling agent with the polymeric linking agent is at a temperature of 15 to 50° C. In certain embodiments, the step of contacting the silane coupling agent with the polymeric linking agent is at a temperature of 10 to 40° C. In certain embodiments, the step of contacting the silane coupling agent with the polymeric linking agent is at a temperature of 15 to 30° C. In certain embodiments, the step of contacting the silane coupling agent with the polymeric linking agent is at a temperature of 15 to 25° C. In certain embodiments, the step of contacting the silane coupling agent with the polymeric linking agent is at a temperature of 20 to 30° C.

The step of contacting the silane coupling agent with the reservoir can be any suitable duration. In certain embodiments, the silane coupling agent is contacted with the reservoir greater than 4 hours. In certain embodiments, the silane coupling agent is contacted with the reservoir greater than 8 hours. In certain embodiments, the silane coupling agent is contacted with the reservoir of from 4 to 48 hours. In certain embodiments, the silane coupling agent is contacted with the reservoir of from 8 to 24 hours. In certain embodiments, the silane coupling agent is contacted with the reservoir of from 8 to 12 hours.

The step of contacting the silane coupling agent with the polymeric linking agent can be any suitable duration to form a covalent bond. In certain embodiments, the silane coupling agent is contacted with the polymeric linking agent greater than 4 hours. In certain embodiments, the silane coupling agent is contacted with the polymeric linking agent greater than 8 hours. In certain embodiments, the silane coupling agent is contacted with the polymeric linking agent of from 4 to 48 hours. In certain embodiments, the silane coupling agent is contacted with the polymeric linking agent of from 8 to 24 hours. In certain embodiments, the silane coupling agent is contacted with the polymeric linking agent of from 8 to 12 hours.

Advantageously, the sand particles in a sandstone reservoir can be agglomerated in less than 24 hours using the method of the present invention. In certain embodiments, the sand particles are agglomerated in less than 20 hours from contact with the silane coupling agent and polymeric linking agent. In certain embodiments, the sand particles are agglomerated in less than 16 hours from contact with the silane coupling agent and polymeric linking agent. In certain embodiments, the sand particles are agglomerated in less than 12 hours from contact with the silane coupling agent and polymeric linking agent. In certain embodiments, the sand particles are agglomerated in less than 8 hours from contact with the silane coupling agent and polymeric linking agent. In certain embodiments, the sand particles are agglomerated in less than 4 hours from contact with the silane coupling agent and polymeric linking agent.

In addition, any suitable pH can be used to assist in the formation of a covalent bond between the polymeric linking agent and silane coupling agent. In some embodiments, the silane coupling agent is contacted with the polymeric linking agent at a pH of 4 to 10. In some embodiments, the silane coupling agent is contacted with the polymeric linking agent at a pH of 7 to 10. In some embodiments, the silane coupling agent is contacted with the polymeric linking agent at a pH of 7 to 9. In some embodiments, the silane coupling agent is contacted with the polymeric linking agent at a pH of 8 to 9. In some embodiments, the silane coupling agent is contacted with the polymeric linking agent at a pH of 4 to 8. In some embodiments, the silane coupling agent is contacted with the polymeric linking agent at a pH of 4 to 7.5. In some embodiments, the silane coupling agent is contacted with the polymeric linking agent at a pH of 4 to 5. In some embodiments, the silane coupling agent is contacted with the polymeric linking agent at a pH of 2 to 5. In some embodiments, the silane coupling agent is contacted with the polymeric linking agent at a pH of 2 to 4.

One skilled in the art would understand that the water used to dissolve polymeric linking agent, silane coupling agent and combinations thereof as an aqueous media can include fresh water, salt water, brine or seawater. In some embodiments, the aqueous media can also contain additional additives. It will be understood that the type of additive depends on the use of the solution and the environment of the reservoir. Suitable additives can be selected from the group consisting of emulsifiers, lime, viscosifiers, weighting agents, fibers, suspending agents, conditioning agents, dispersants, water softeners, oxidation and corrosion inhibitors, thinners, acid gas scavengers, surfactants and combinations thereof.

In certain embodiments, it may be desirable to control the permeability of the resulting agglomerated sand composition. One skilled in the relevant art would understand that the permeability can be controlled by selecting appropriate amounts of silane coupling agent and polymeric linking agent Without being bound by any one theory, it is believed that the permeability of the agglomerated material is inversely proportional to the amount of covalent bond formation between the silane coupling agent and polymeric linking agent.

Advantageously, the method of the present invention provides agglomerated sand compositions having a higher permeability to water compared to sand consolidation technologies as previously discussed above. This can allow hydrocarbon production in sandstone reservoirs while maintaining flow to maximise sand-free hydrocarbon production rate.

In one embodiment, the polymeric linking agent and silane coupling agent is free of cross-linking to provide improved permeability. In one embodiment, the silane coupling agent and polymeric linking agent does not form a hardenable resin.

In certain embodiments, the agglomerated sand composition has a permeability to water of from 0.2 to 10 Darcys. In certain embodiments, the agglomerated sand composition has a permeability to water of from 0.8 to 10 Darcys. In one embodiment, the agglomerated sand composition has a permeability to water of from 2 to 8 Darcys. In one embodiment, the agglomerated sand composition has a permeability to water of from 2 to 5 Darcys. In one embodiment, the agglomerated sand composition has a permeability to water of from 3 to 5 Darcys. In one embodiment, the agglomerated sand composition has a permeability to water of from 0.2 to 0.8 Darcys. In one embodiment, the agglomerated sand composition has a permeability to water of from 0.2 to 1 Darcys. In one embodiment, the agglomerated sand composition has a permeability to water of from 0.5 to 8 Darcys. In one embodiment, the agglomerated sand composition has a permeability to water of from 0.5 to 5 Darcys. In one embodiment, the agglomerated sand composition has a permeability to water of from 5 to 8 Darcys.

In certain embodiments, the ratio of the permeability to water of agglomerated sand composition to untreated sand particles is 0.2:1 to 0.8:1. In one embodiment, the ratio of the permeability to water of agglomerated sand composition to untreated sand particles is 0.3:1 to 0.8:1. In one embodiment, the ratio of the permeability to water of agglomerated sand composition to untreated sand particles is 0.3:1 to 0.5:1. In one embodiment, the ratio of the permeability to water of agglomerated sand composition to untreated sand particles is 0.3:1 to 0.4:1. In one embodiment, the ratio of the permeability to water of agglomerated sand composition to untreated sand particles is 0.6:1 to 0.8:1.

In some embodiments, the covalent bond formed between the silane coupling agent and the polymeric linking agent can be hydrolysed under suitable conditions. In some embodiments, hydrolysis of the covalent bond formed between the silane coupling agent and polymeric linking agent can increase permeability of the agglomerated sand composition. In one embodiment, the covalent bond formed between the silane coupling agent and the polymeric linking agent is hydrolysed under acidic conditions. In one embodiment, any suitable acid can be used to hydrolyse the covalent bond formed between the silane coupling agent and the polymeric linking agent. Suitable acids can be selected from the group consisting of inorganic acids, sulfonic acids, carboxylic acids, halogenated carboxylic acids, vinylogous carboxylic acids and combinations thereof. Advantageously, hydrolysis of the covalent bond can provide control of the permeability of the agglomerated sand composition.

Suitable acids can be selected from the group consisting of hydrofluoric acid (HF), hydrochloric acid (HCl), hydrobromic acid (HBr), hydroiodic acid (HI), hypochlorous acid (HClO), chlorous acid ($HClO_2$), chloric acid ($HClO_3$), perchloric acid ($HClO_4$), and corresponding compounds for bromine and iodine, sulfuric acid ($H_2SO_4$), fluorosulfuric acid ($HSO_3F$), nitric acid ($HNO_3$), phosphoric acid ($H_3PO_4$), fluoroantimonic acid ($HSbF_6$), fluoroboric acid ($HBF_6$), hexafluorophosphoric acid ($HPF_6$), chromic acid ($H_2CrO_4$), boric acid ($H_3BO_3$), methanesulfonic acid ($CH_3SO_3H$), ethanesulfonic acid ($CH_3CH_2SO_3H$), benzenesulfonic acid ($C_6H_5SO_3H$), p-toluenesulfonic acid ($CH_3CH_4SO_3H$), trifluoromethanesulfonic acid ($CF_3SO_3H$), polystyrene sulfonic acid, acetic acid ($CH_3COOH$), citric acid ($C_6H_6O_7$), formic acid (HCOOH), gluconic acid, lactic acid, oxalic acid, tartaric acid, fluoroacetic acid, trifluoroacetic acid, chloroacetic acid, dichloroacetic acid, trichloroacetic acid, ascorbic acid and combinations thereof.

In some embodiments, the method of the invention can further comprise the step of adding additional polymeric linking agent to the agglomerated sand composition to decrease permeability. In certain embodiments, the hydrolysis step and the step of adding additional polymeric linking agent as discussed above can be iterative to provide fine control of the permeability of the resulting agglomerated sand composition.

It will be understood by a person skilled in the relevant art, that the method of the present invention can further comprise a washing step at any stage. In certain embodiments, prior to addition of the polymeric linking agent or silane coupling agent, the sandstone reservoir can be washed. In one embodiment, the sandstone reservoir is washed using an aqueous medium. In one embodiment, the washing step can comprise addition of a co-solvent which is miscible with water to remove any unwanted organic material from the reservoir. In one embodiment, the co-solvent is selected from the group consisting of acetone, acetonitrile, dimethyl formamide, dimethyl sulfoxide, dioxane, ethanol, isopropyl alcohol, methanol, tetrahydrofuran and combinations thereof.

The pre-washing step as discussed above can remove debris, displace pre-existing reservoir fluids, precondition the surface of the sand particle and remove loose particulate material.

In some embodiments, after agglomeration of the sand particles, the sandstone reservoir can be washed to remove unreacted silane coupling agent or polymeric linking agent.

In some embodiments, after the hydrolysis step, the sandstone reservoir can be washed to remove hydrolysed polymeric linking agent. In some embodiments, after addition of additional polymeric linking agent, the sandstone reservoir can be washed to remove unreacted polymeric linking agent.

In another embodiment, the sand particles agglomerated using the method of the present invention can be used for increasing sand retention of a sand screen in a wellbore. In a further embodiment, the sand particles agglomerated using the method of the present invention can be used for stabilising a portion of a wellbore.

It will be understood by one skilled in the relevant art that any suitable technique can be used to agglomerate sand particles in a sandstone reservoir using the method of the present invention.

Reservoirs containing gas, oil and water present in a subterranean formation, such as a sandstone reservoir, is typically produced by drilling a wellbore to the subterranean formation while circulating a drilling fluid in the wellbore. Once the circulation of the drilling fluid has ceased, a string of pipe such as a casing is passed through the wellbore. Subsequently, the drilling fluid is circulated through the exterior of the pipe and the surface of the wellbore. This is then typically followed by a primary cementing step wherein a cement slurry is placed in the annulus and is cured to harden thereby attaching the string of pipe to the surface of the wellbore which seals the annulus. Additional cementing steps can be performed if desired.

The oil or gas present in the subterranean formation can then be produced by applying a pressure gradient between the formation and the wellbore. This pressure gradient can be applied by driving a fluid into the wellbore. The displacement of the fluid using a pump or the force of another fluid which is injected into the well or adjacent well results in recovery of the oil or gas.

The production of the fluid in the formation may be increased by hydraulically fracturing the formation. For example, a viscous fracturing fluid may be pumped down the casing to the formation at a rate and a pressure sufficient to form fractures that extend into the formation, providing additional pathways through which the oil or gas can flow to the well. As discussed previously, unwanted water can also be produced with the oil or gas produced from the formation. In certain embodiments, the method of the present invention can be used at this stage to agglomerate the sand particles of the formation to control water production and improve hydrocarbon production efficiency.

In certain embodiments, the sandstone reservoir can be characterised using coefficient of uniformity ($U_c$). The method of the present invention to control sand production of sandstone reservoirs can have any suitable $U_c$ where the wellbore of the reservoir requires agglomeration due to unwanted sand production.

The coefficient of uniformity ($U_c$) of sand is defined as a ratio: the size at which 60 percent (by weight) of a sand sample passes through a sieve (in other words 60 percent of the sand is finer than a given size) divided by the size at which 10 percent of the same sample (by weight) passes through a sieve (10 percent is finer than a given size). For example, a $U_c$ of 1 indicates all the particles are the same size.

Coefficient of uniformity $U_c = D_{60}/D_{10}$, where $D_{60}$=diameter in the particle-size distribution curve corresponding to 60% finer and $D_{60}$=diameter in the particle-size distribution curve corresponding to 10% finer. The particle-size distribution curve of a sample can be measured using any suitable particle size analyser such as a Malvern laser particle size analyser.

The present invention can retain sand behind a target sand screen by augmenting the coefficient of uniformity ($U_c$) of the sand. In some embodiments, the $U_c$ of untreated reservoir sand can be modified from around 40 to less than 3 after using the method of the present invention. In some embodiments, the untreated sandstone reservoir has a $U_c$ of less than 40, less than 30, less than 20, less than 10, less than 8, less than 6, less than 5 or less than 3.

In some embodiments, the agglomerated sand composition has a $U_c$ of less than 30, less than 20, less than 15, less than 10, less than 8, less than 6, less than 5 or less than 3.

In certain embodiments, the agglomerated sand composition can be characterised using any suitable technique such as infra-red spectroscopy, X-ray photoelectron spectroscopy (XPS), scanning electron microscopy (SEM), energy dispersive X-ray spectroscopy, Time-of-Flight secondary ion mass spectrometry (ToF-SIMS) and combinations thereof.

Typically, the agglomerated sand composition of the present invention is characterised using X-ray photoelectron spectroscopy to monitor the surface and not the bulk composition. XPS measures the surface chemistry of surfaces to a depth of 10 nm typically, depending on the beam used. The data of the surface chemistry of the agglomerated sand composition is quantitative to this depth and is compared to the surface chemistry of the sand particles before treatment using the method of the present invention (untreated sand composition).

Typically, a field sample of agglomerated sand composition would be isolated and washed with an organic solvent (for example hexane or toluene) to remove oil and then dried. A washing step using organic solvent would also be performed for the untreated sand particles as a control and to remove contaminants. There would be a difference in the surface chemistry that can include (1) increase in atomic percentage of the nitrogen peak (N 1s) as it is only present in trace amounts on the untreated sand particles while it is present in the agglomerated sand composition and (2) increase in the atomic percentage of the carbon peak (C4 in the high resolution C 1s peak), as this component is associated with amide groups (from the polymeric linking agent). The ratio of C4/C5 in the carbon peak (C 1s) will depend on the ratio of the monomers of the polymeric linking agent to some degree although the underlying sand can affect this ratio.

When the agglomerated sand composition is characterised using XPS, the increase in atomic percentage of nitrogen (N 1s at 399-400 eV) compared to untreated sand particles can be monitored to detect nitrogen from the polymeric linking agent to indicate agglomeration. Additionally, in certain embodiments, increase in atomic percentage of nitrogen (N 1s band) with the atomic percentage increase of carbon (C 1s band) for the agglomerated sand composition compared to untreated sand particles can indicate amide bond formation.

In one embodiment, the atomic percentage of the nitrogen peak (N 1s) of the agglomerated sand composition particles measured by X-ray photoelectron spectroscopy is greater than 2%. In one embodiment, the atomic percentage of the nitrogen peak (N 1s) of the agglomerated sand composition particles measured by X-ray photoelectron spectroscopy is greater than 5%. In one embodiment, the atomic percentage of the nitrogen peak (N 1s) of the agglomerated sand composition particles measured by X-ray photoelectron spectroscopy is of from 5 to 20%. In one embodiment, the atomic percentage of the nitrogen peak (N 1s) of the agglomerated sand composition particles measured by X-ray photoelectron spectroscopy is of from 5 to 15%. In one embodiment, the atomic percentage of the nitrogen peak (N 1s) of the agglomerated sand composition particles measured by X-ray photoelectron spectroscopy is of from 5 to 10%.

While the absolute atomic percentage of the nitrogen peak can be expressed to characterise the agglomerated sand composition, it may also be convenient to express the atomic percentage as a ratio of agglomerated sand composition to untreated sand particles. In one embodiment, the ratio of the atomic percentage of the nitrogen peak (N 1s) of the agglomerated sand composition to untreated sand particles measured by X-ray photoelectron spectroscopy is at least from 3:1. In one embodiment, the ratio of the atomic percentage of the nitrogen peak (N 1s) of the agglomerated sand composition to untreated sand particles measured by X-ray photoelectron spectroscopy is at least from 5:1. In one embodiment, the ratio of the atomic percentage of the nitrogen peak (N 1s) of the agglomerated sand composition to untreated sand particles measured by X-ray photoelectron spectroscopy is of from 3:1 to 30:1. In one embodiment, the ratio of the atomic percentage of the nitrogen peak (N 1s) of the agglomerated sand composition to untreated sand particles measured by X-ray photoelectron spectroscopy is of from 5:1 to 30:1. In one embodiment, the ratio of the atomic percentage of the nitrogen peak (N 1s) of the agglomerated sand composition to untreated sand particles measured by X-ray photoelectron spectroscopy is of from 10:1 to 30:1. In one embodiment, the ratio of the atomic percentage of the nitrogen peak (N 1s) of the agglomerated sand composition to untreated sand particles measured by X-ray photoelectron spectroscopy is of from 15:1 to 30:1. In one embodiment, the ratio of the atomic percentage of the nitrogen peak (N 1s) of the agglomerated sand composition to untreated sand particles measured by X-ray photoelectron spectroscopy is of from 20:1 to 30:1.

In some embodiments, the agglomerated sand composition would (1) show increased levels of nitrogen (specific to the polymeric linking agent) using surface sensitive techniques such as XPS; (2) increased inter-particle associations as determined using microscopy, for example SEM; (3) from reservoir production data the amounts of produced sand would be decreased in a sandstone reservoir; and (4) from reservoir data the permeability would have changed after treatment.

EXAMPLES

The present invention will now be described with reference to the following examples.

Example 1: Evaluation of Agglomeration Using Silane Coupling Agent and Polymeric Linking Agent Using Fumed Silica Approximately 2 g of fumed silica (approximate particle size 500 nm) was weighed into 14 sample vials SASi-PAA labelled as 01A to 07B. Both samples A and B in a pair were treated identically for reproducibility. Samples 01A and 01B were comparative samples with no polymeric linking agent added but were treated using the same physical process as all other samples.

The fumed silica was first treated under different conditions, then a solution of (3-aminopropyl)triethoxysilane (APTS) and a solution of polyacrylamide-poly(acrylic acid) partial sodium salt (Mw 520000; Mn 150000 (typical); acrylamide about 80 wt %) (hydrolyzed and activated using N-Hydroxysuccinimide (NHS) and 1-ethyl-3-(3-dimethylaminopropyl)carbodiimide (EDC)) were added to the fumed silica. The amount and concentration of each component as well as order of addition into each pair of samples 01-07 are summarised in Table 1.

After treatment, all samples were washed with water followed by centrifugation, decanting the supernatant, further addition of water and redispersing the sample. This process was repeated at least four times. Any residual chemicals (silane coupling agent and polymeric linking agent) not bound to the silica particles were estimated to be diluted by at least $10^5$ times by this process. All samples were then dried in a vacuum oven at 40° C. over 3 days. The final dry weight of each sample was accurately weighed and compared to the original weight. The results are shown in Table 1.

Comparative samples 01A and 01B had unavoidable loss of particles and therefore loss of weight during the washing process. This amount of weight loss was estimated to be similar to the other samples as all samples underwent exactly the same washing process. The increase or decrease in weight, in samples 02-07 indicates degree of attachment of polymeric linking agent to the silica surface. An increase in weight in Table 1 shows significant attachment of polymeric linking agent to the sand particles.

Figure 2:
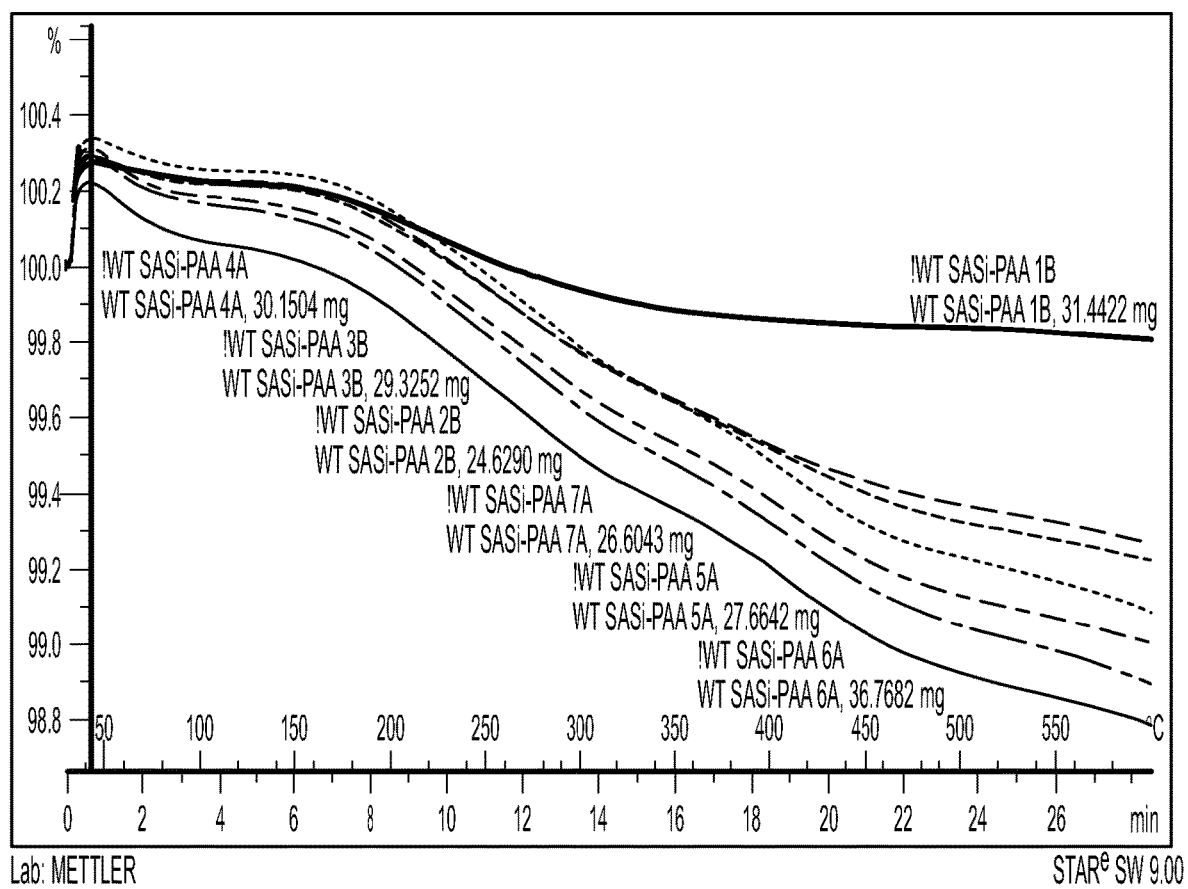
FIG. 2 shows thermogravimetric analysis (TGA) of fumed silica samples.

Thermal gravimetric analysis was also performed on each of the samples for each pair. The results are shown in FIG. 2. Except for sample 18, where the mass loss stabilized at about 250° C., all other samples show continued loss of mass, indicating presence of the polymeric linking agent.

TABLE 1

Compositions and treatment to fumed silica samples 01A-07B.

| | Condition Treatment | | | | |
|---|---|---|---|---|---|
| | Comparative Sample, No polymeric linking agent added, water only | Dry silica to polymer solution | Silica heated in water | Silica heated at pH 11 | Addition of APTS solution and polymeric linking agent sequentially |
| Sample | 1A  1B | 2A  2B | 3A  3B | 4A  4B | 5A  5B  6A  6B  7A  7B |
| | blank sample (no further treatment) | left in vial as dry powder | added 20 mL water | added 20 mL NaOH solution at pH 11 | Added 10 mL of 1.6 mg/mL APTS solution to each sample, left in oven at 90° C. for 24 hours |

TABLE 1-continued

Compositions and treatment to fumed silica samples 01A-07B.

| | Condition Treatment | | | | |
|---|---|---|---|---|---|
| | Comparative Sample, No polymeric linking agent added, water only | Dry silica to polymer solution | Silica heated in water | Silica heated at pH 11 | Addition of APTS solution and polymeric linking agent sequentially |
| Sample | 1A 1B | 2A 2B | 3A 3B | 4A 4B | 5A 5B  6A 6B 7A 7B |
| | added 20 mL water | added 20 mL activated HPAM + APTS, to dry powder samples 2A-2B, and to wet paste samples 3A-4B | | heated on hot plate at 80° C. overnight, centrifuged, discarded solvent | Added 10 mL of 2% HPAM solution to each sample<br><br>use non activated HPAM polymer |
| Weight change % | -1.7  -2.0 | 1.1  1.1 | 0.0  0.1 | -0.3  -0.1 | 0.1 0.2  -0.3 0.0  0.4 0.3 |

HPAM = partially hydrolysed polyacrylamide
APTS = (3-aminopropyl)triethoxysilane Example 2: Evaluation of Agglomeration Using Silane Coupling Agent and Polymeric Linking Agent Using Finely Ground Sand Approximately 2 g of finely ground sand (10 to 500 μm) was accurately weighed into sample vials labelled as VF1-VF4. Sample VF1 is a comparative sample with no polymeric linking agent but were treated using the same physical process as all other samples. An aqueous solution of (3-aminopropyl)triethoxysilane (APTS) (10 mL) was added to each sample. The concentration of the solutions added to samples VF1-VF4 were 0, 0.05, 0.10 and 0.10 g/mL, respectively. Samples VF1 and VF4 were tumbled (agitated) at room temperature while samples VF2 and VF3 were left on a hot plate at 80° C. for at least 16 hours. The samples were then centrifuged and the supernatant (clear liquid) was decanted.

A solution of 1% poly(acrylamide)-poly(acrylic acid) (20 mL; Mw 520000; Mn 150000 (typical); acrylamide about 80 wt %) (hydrolyzed and activated using N-Hydroxysuccinimide (NHS) and 1-ethyl-3-(3-dimethylaminopropyl)carbodiimide (EDC)) was added to each of the sample vials VF2-VF4. 20 mL of water was added to sample VF1. The samples were vigorously shaken to redisperse all compacted sand into the added polymeric linking agent solution. The samples were tumbled overnight.

After the treatment, all samples were washed with water followed by centrifugation, decanting the supernatant, further addition of water and redispersing the sample. This process was repeated at least five times. Any residual chemicals (silane coupling agent and polymeric linking agent) not bound to the finely ground sand particles were estimated to be diluted by at least $10^5$ times by this process.

The samples were dried at 80° C. until no further changes in weight were recorded. The final dry weight of each sample was accurately weighed and compared to the original weight. The percentage changes in weight of each sample VF1-VF4 were -1.1%, 0.5%, 0.6% and 1.0%, respectively.

Comparative sample VF1 had unavoidable loss of particles and therefore weight loss during the washing process. This amount of loss of weight was estimated to be similar to the other samples as all samples underwent exactly the same washing process. The significant increase in weight (as measured) of samples VF2-VF4 indicate significant attachment of polymeric linking agent to the sand. The difference in increase of weight between VF2-VF4 reflects the difference in concentration of chemical used as well as the temperature the samples were treated under.

X-ray photoelectron spectroscopy (XPS) was used to evaluate the surface composition of the dry samples and results are shown in Table 2.

XPS spectra were acquired using an Axis Ultra DLD spectrometer (Kratos Analytical, UK) with a monochromated Al Kα source. Photoelectrons were transferred to the 165 mm hemispherical analyzer using a combined magnetic and electrostatic lens system. In spectroscopy mode, the samples were irradiated with monochromatic Al Kα source (hn ¼ 1486.6 eV, spot size 300 mm 700 mm) and photoelectrons were collected using eight channeltrons. The sample was isolated electrically in order to eliminate vertical differential charging, and a low-energy electron flood gun was used for charge compensation. The data was converted to VAMAS format and processed using CasaXPS, version 2.2.37. Survey spectra were obtained from the surface at 160 eV pass energy, 1 eV step size, from 1200 eV to 0 eV, and quantified using empirically derived sensitivity factors. To confirm the surface chemistry, high resolution C is spectra were collected at pass energy of 20 eV and step size of 0.1 eV for a minimum 300 s. The nitrogen (N 1s) peak was measured at approximately 399-400 eV.

The result shows significant higher amounts of carbon and nitrogen in samples VF2-VF4 compared to negligible amounts of carbon (C) and nitrogen (N) in the comparative sample VF1. This indicates significant amounts of polymeric linking agent and silane coupling agent were attached to the surface of the sand particles as carbon and nitrogen Is abundant in both of these component whereas the presence of carbon and nitrogen is not expected in sand.

TABLE 2

XPS data measures of samples VF1-VF4 (atomic percentage, %). Listed are the mean values and the deviation (±) is based on 2 analyses points.

|       | VF1  |      | VF2   |      | VF3   |      | VF4   |      |
|-------|------|------|-------|------|-------|------|-------|------|
|       | Mean | Std  | Mean  | Std  | Mean  | Std  | Mean  | Std  |
| Co 2p | 0.15 | 0.04 | 0.00  | 0.00 | 0.00  | 0.00 | 0.08  | 0.04 |
| O 1s  | 65.28| 0.04 | 39.79 | 0.86 | 37.62 | 2.51 | 44.43 | 0.30 |
| N 1s  | 0.37 | 0.06 | 9.65  | 0.28 | 10.27 | 0.75 | 7.68  | 0.08 |
| C 1s  | 4.85 | 0.16 | 33.71 | 0.75 | 36.18 | 3.56 | 27.47 | 0.22 |
| Si 2p | 29.38| 0.04 | 16.86 | 0.16 | 15.94 | 1.80 | 20.35 | 0.13 |

Std = deviation

Example 3: Agglomeration Using Flow Cell Testing

Figure 3:
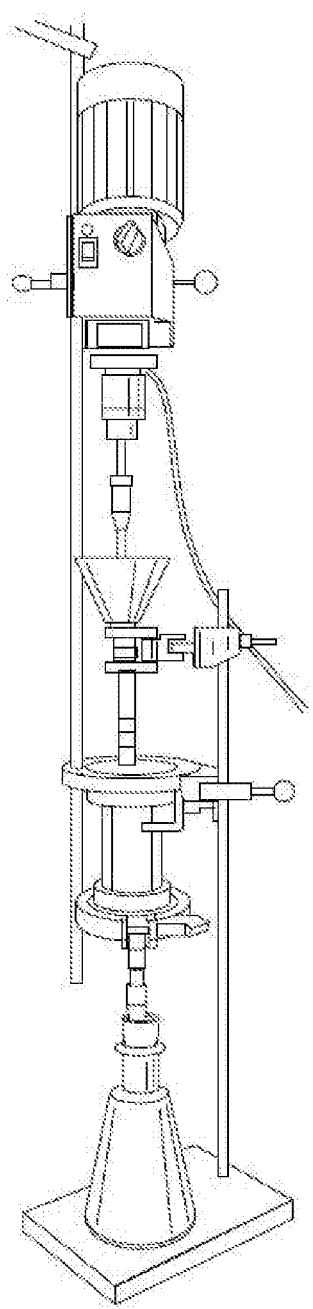
FIG. 3 shows a photographic image of a typical flow cell for agglomeration testing.
Figure 4:
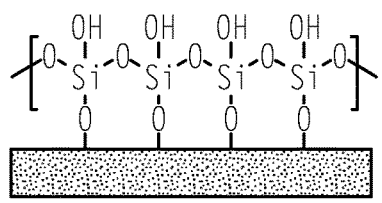
FIG. 4 is an illustration showing agglomeration in accordance with embodiments of the present invention for a sandstone reservoir.
Figure 4:
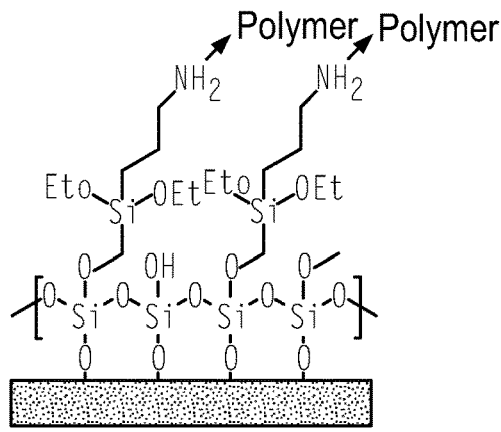

A Perspex cylindrical cell with approximately 0.5 mm steel filters at both ends was used to contain tightly packed 420-600 µm coarse sand. The top inlet was connected to a glass funnel through which a plastic cable tie was inserted and driven by an overhead stirrer. The bottom outlet was connected to a flask with connection to a house vacuum. Fine ground sand (5 g, 10-38 µm) was mixed in water and poured into the funnel. The stirring of the plastic cable end scraping the top screen assists with mixing of the fine sand and allows it to flow into the cell while water is being pulled through with the assistance of reduced pressure at the outlet. Typically, the fine sand that remains above the screen was scraped out, mixed with water and placed into the cell again. This process was repeated at least four times until all or most of the fine is loaded into the cell. The amount of unloaded fine was dried and weighed to determine how much fine remained in the cell. A typical setup of the flow cell is shown in FIG. 3.

For the treated samples, after loading the fine into the same packed coarse cell, the following procedure was followed. Approximately 100 mL of 5% APTS solution was flowed through the cell. Subsequently, approximately 100 mL of 0.5% of poly(acrylamide-poly(acrylic acid) solution (Mw 520000; Mn 150000 (typical); acrylamide about 80 wt %) (activated with EDC and NHS) in 1% APTS was then passed through the sample. The cell was capped at both ends and stored in an oven at 80° C. for at least 16 hours. This step was skipped for the untreated sample.

The cell was then inverted and connected to a displacement pump to pump water in the reverse direction. All fine sand produced was collected, dried and weighed. This formed the basis for the unattached amount of fine when untreated.

The unattached ratio of fine sand compared to total loaded amount was 81% and 25% for the untreated and treated samples, respectively. This shows that the amount of fine sand retained in the cell is 19% for the untreated sample, due to mechanical constraints. Under the same conditions, the treated sample retained 75% of the fine sand. This increase the amount of retained fine sand is due to the agglomeration of sand particles.

Example 4: Agglomeration Using Flow Cell Testing (Alternative Loading Method)

A perspex cylindrical cell with approximately 0.5 mm steel filter at one end was loaded with a dry mixture of 44.0 g of coarse sand (420-600 µm) and 4.4 g of fine sand (10-38 µm). The sand mixture was poured in small amounts into the cell, compacted and wet with water and repeated until all sand was packed. Another 0.5 mm steel filter was fixed to the upper end of the cell and secured. The cell was then connected to displacement pump for different solutions to be pumped through.

Untreated samples were pumped through with water for at least 24 hours at a pump rate of 60 mL/min. All fine sand produced was collected, dried and weighed. The amount of fine produced was 16-25% of the original loaded fine.

Other samples were treated using the following procedure. An excess amount of 10% APTS in aqueous solution was pumped through the cell. The cell was capped and left in an oven set at 80° C. between 6-24 hours. The cell was then pumped through with a poly(acrylamide-poly(acrylic acid) solution (Mw 520000; Mn 150000 (typical); acrylamide about 80 wt %) (activated with EDC and NHS) and left in oven at 80V between 6-24 hours. The cell was then pumped with water in the reverse direction at a pump rate of 60 mL/min for at least 24 hours. All fine sand produced was collected, dried and weighed. The amount of fine produced was 1-7% of the original loaded fine.

The results showed that the significant decrease in free fine sand (or increase in the retained fine sand) is due to the agglomeration of sand particles.

Example 5: Measuring Permeability Across Sand Pack

Figure 5:
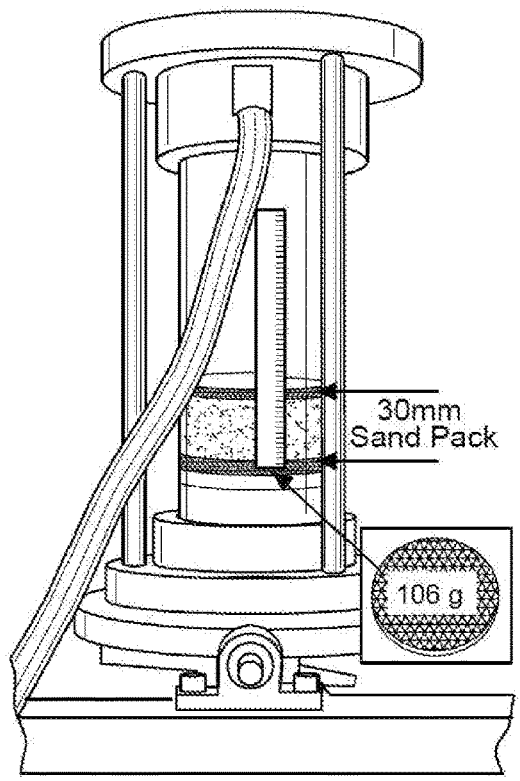
FIG. 5 Sand retention cell used for testing the composition. Photographic image of an alternative typical flow cell for agglomeration testing showing use of a 30 mm sand pack (as indicated by arrows) and large sand particles (~150 microns) were retained in the column using a stainless steel frit (inset).

A 10% (w/v %) solution of APTS (500 mL) was injected into a sand pack (particles less than 150 µm; atomic % of surface nitrogen as measured by X-ray photoelectron spectroscopy using methodology in Example 2 is 0.55 N1S) as shown in FIG. 5 from top to bottom. The sand is then fully immersed in the solution for at least 8 hour, after this time the APTS solution is drained. A 500 mL solution of 0.5 w/v % poly(acrylamide-poly(acrylic acid) solution (Mw 520000; Mn 150000 (typical); acrylamide about 80 wt %) is reacted with EDC and NHS and was immediately mixed with a 1% APTS solution (50 mL). The resulting solution was injected from top to bottom, to ensure the sand is fully immersed in the solution for at least 24 hours. The solution was subsequently drained from the sand pack and the sand particles were agglomerated.

After treatment as discussed above, the atomic % of surface nitrogen as measured by X-ray photoelectron spectroscopy increased from 0.55% (N 1s) to 2.68% (N 1s).

Figure 6A:
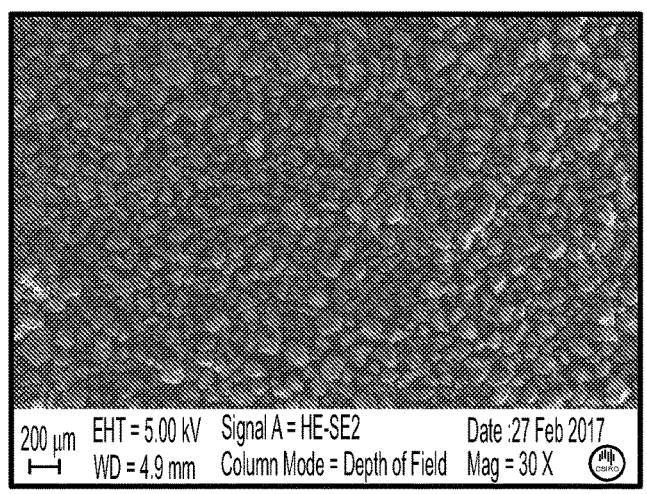
FIG. 6 Scanning electron micrographs of a) untreated sand particles; and b) agglomerated sand composition treated using the method of the present invention.
Figure 6B:
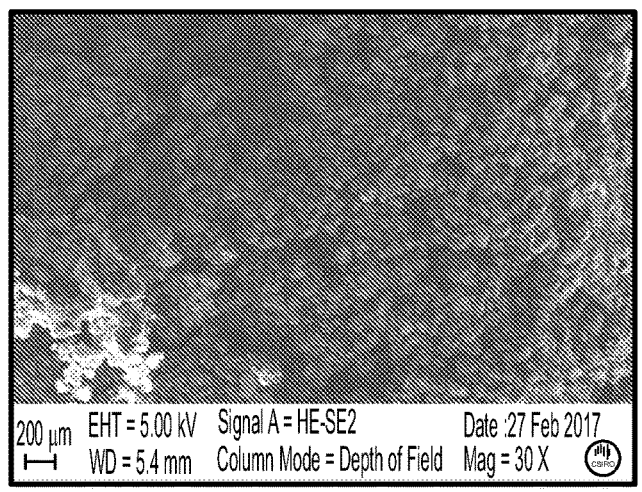
Figure 7:
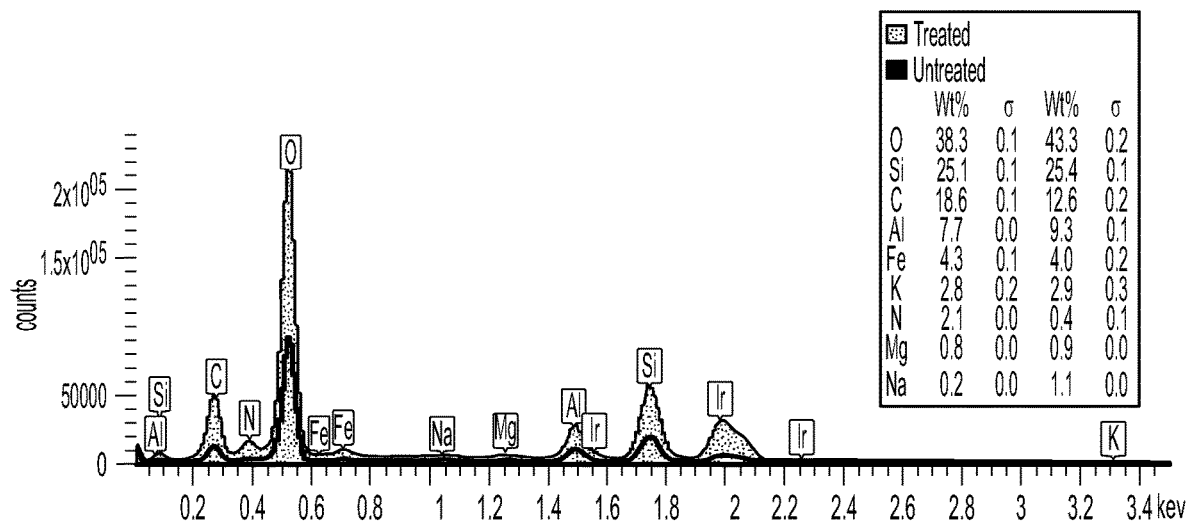
FIG. 7 Energy dispersive X-ray spectra on untreated sand particles and agglomerated sand particles.

Complementary techniques can be used in addition to XPS characterisation. Suitable exemplary techniques include scanning electron microscopy (SEM) and energy dispersive X-ray spectroscopy (EDX) as shown in FIGS. 6-7.

SEM analysis can be carried out on the agglomerated sand composition and compared to untreated sand particles to determine if there is a difference in the agglomerated particle size as a result of agglomeration using the method of the present invention.

Without treatment the column produces significant volumes of sand because the sand screen cannot retain the small fines. This is similarly encountered in a sandstone reservoir. After treatment with the composition outlined above using the method of the present invention, there was no visible production of sand and the permeability of the column was largely retained as shown in FIG. 8.

The permeability to water of either the untreated or agglomerated sand composition can be measured using any suitable technique. In one exemplary technique, the permeability is calculated using the pressure across the untreated or agglomerated sand composition measured at both ends of a sand retention cell as shown in FIGS. 3 and 5 using Darcy's law. Darcy's law is expressed as follows:

$k = q\mu L/A\Delta P$ where k=permeability, q=flow rate; $\Delta P$=pressure differential; A=area; $\mu$=viscosity; and L=length.

Figure 8:
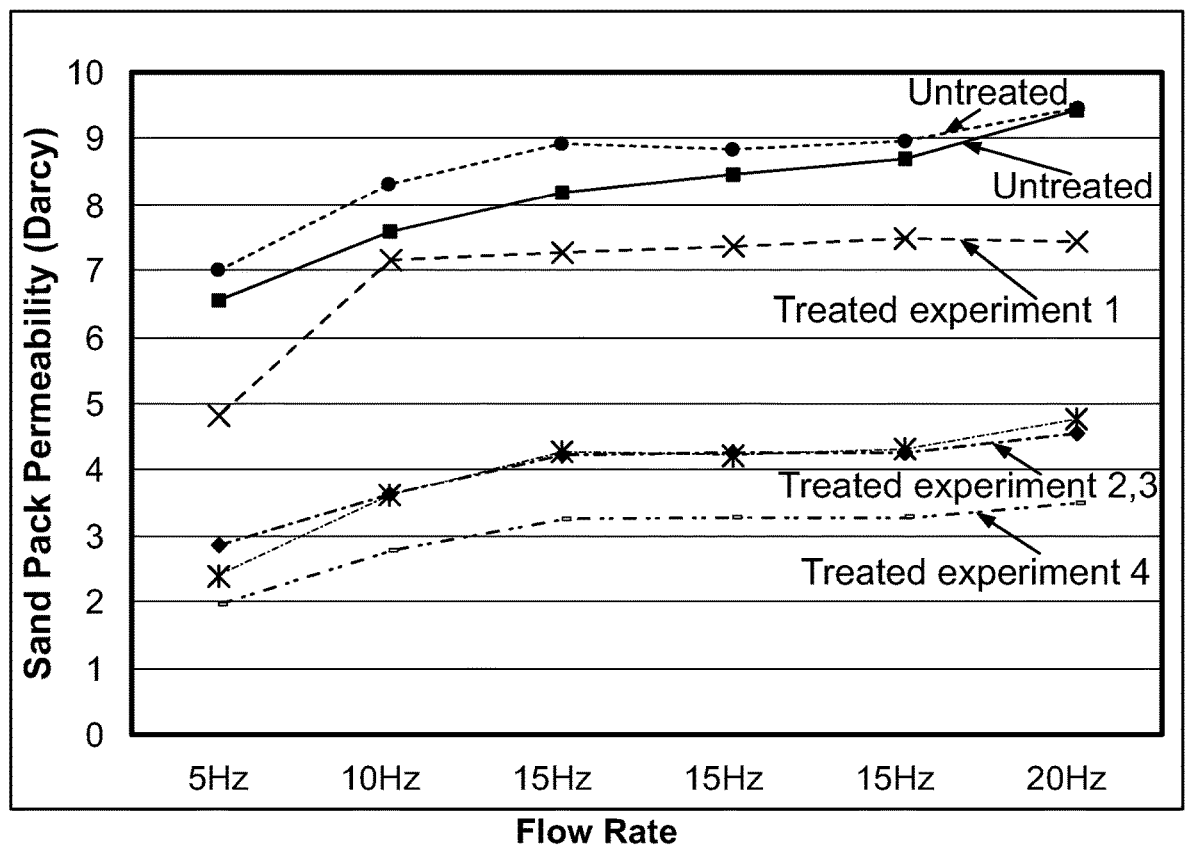
FIG. 8 Effect of flow rate on permeability to water across the sand pack of embodiment discussed in Example 5 for untreated sand particles (labelled upper curves circles and squares) compared to agglomerated sand composition.

The permeability results shown in FIG. 8 shows that after treatment, the agglomerated sand composition has a higher permeability compared to consolidation techniques. The permeability to water of agglomerated sand composition is greater than 0.5 Darcys and ranges from approximately 2 to 8 Darcys. It should be noted that the permeability of the agglomerated sand composition is lower than untreated sand particles indicating agglomeration.

Example 6: Agglomeration Using Mannich Reaction

Typically, a formaldehyde solution (37% solution, 0.275 g) was added to 20.5 g of a 4% (w/v) poly(acrylamide-poly (acrylic acid) solution (Mw 520000; Mn 150000 (typical); acrylamide about 80 wt %) (solution A). A separate solution of water (92 mL) and APTS (5.25 mL) was prepared (solution B). Solution A and Solution B were mixed and added to approximately 2 g of fumed silica (approximate particle size 500 nm) for 16 hours.

After the treatment, all samples were washed with water followed by centrifugation, decanting the supernatant, further addition of water and redispersing the sample. This process was repeated at least five times. Any residual chemicals (silane coupling agent and polymeric linking agent) not bound to the finely ground sand particles were estimated to be diluted by at least $10^5$ times by this process.

After treatment with the composition outlined above using the method of the present invention, there was no visible production of sand and the permeability of the column was largely retained as measured using Examples 3-5 (see FIGS. 3 and 5). However, the control sample (without treatment) produced significant volumes of sand. The permeability to brine decreased (see Table 3) after agglomeration compared to the control sample. Permeability was measured using Darcy's law as in Example 5.

TABLE 3

Sand production and permeability measurements of samples agglomerated using Mannich reaction

| Sand Pack | Sample Details | Sand Type | Treatment | Sand Amount (g) | Permeability (Darcys) | Analytical |
|---|---|---|---|---|---|---|
| #1 | Surface sand baseline | INCAST 70 | Untreated | 1.52 | 6.5-9.4 | LPSDx2, XRD |
| #1 | Baseline-repeat | INCAST 70 | Untreated | 0.81 | 7.0-9.4 | |
| #2 | 1$^{st}$ treated | INCAST 70 | Treated | 1.53 | 5.2-10.2 | |
| #3 | 2$^{nd}$ treated | INCAST 70 | Treated | No to trace | 4.8-7.4 | LPSD |
| #3 | 2$^{nd}$ treated-repeat | INCAST 70 | Treated | No to trace | 2.4-4.7 | |
| #4 | 3$^{rd}$ treated | INCAST 70 | Treated | No to trace | 2.8-4.5 | |
| #4 | 3$^{rd}$ treated-repeat | INCAST 70 | Treated | No to trace | 2.0-3.5 | |
| #5 | Reservoir sand-Baram baseline | Baram C2/B2 | Untreated | 4.06 | 2.5-5.0 | LPSD, XRD |
| #6 | Reservoir sand-Baram treated | Baram C2/B2 | Treated | 0.12 | 0.2-0.4 | |
| #6 | Reservoir sand-Baram treated (repeat) | Baram C2/B2 | Treated | 0.12 | 0.2-0.5 | |
| #7 | Reservoir sand-Baram treated (long term with DI water followed by sea water) | Baram C2/B2 | Treated | No to trace | — | |
| | Reservoir sand-Tembungo-1 (baseline) | Tembungo-1 C2/B1 | Untreated | — | — | LPSD, XRD |
| #8 | 1$^{st}$ treated | Tembungo-1 C2/B1 | Treated | 0.12 | 0.63-3.8 | |
| #8 | 1$^{st}$ treated-repeat | Tembungo-1 C2/B1 | Treated | No to trace | 0.35-1.8 | |
| #8 | 1$^{st}$ treated-long term with DI water | Tembungo-1 C2/B1 | Treated | No to trace | 0.3-1.9 | |

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of controlling sand production in a sandstone reservoir comprising
providing (i) an aminosilane; and (ii) a polymeric linking agent comprising monomeric units having pendent functional groups selected from the group consisting of carboxylic acids, carboxylic acid esters and amides; and (iii) an activating agent comprising formaldehyde; wherein a plurality of the pendent functional groups are reacted with the amino group of the aminosilane by a process of Mannich reaction between the amino group of the aminosilane and a plurality of at least one of carboxylic acid and amide pendent groups in the presence of the formaldehyde activating agent,
contacting the aminosilane and polymeric linking agent with the sandstone reservoir to bond the silane group of the aminosilane with particles of sand and provide agglomeration as a result of the formaldehyde activated Mannich reaction producing covalent bonding of the linking agent with a plurality of aminosilanes.

2. A method according to claim 1, wherein the polymeric linking agent has a weight average molecular weight of from 20000 to 1000000 Da.

3. A method according to claim 1, wherein the polymeric linking agent is a copolymer of at least one acid monomer selected from acrylic acid and methacrylic acid and a comonomer selected from the group consisting of acrylamide, olefins, vinyl alcohol, ethylene oxide, ethyleneimine and N-vinylpyrrolidone.

4. A method according to claim 3, wherein the polymeric linking agent is a copolymer selected from the group consisting of polyacrylamide-poly(acrylic acid), polyvinyl alcohol-poly(acrylic acid), poly(ethylene oxide)-poly(acrylic acid), polyamine-poly(acrylic acid), polyethyleneimine-poly(acrylic acid), polyvinylpyrrolidone-poly(acrylic acid) and combinations thereof.

5. A method according to claim 1, wherein the polymeric linking agent comprises a plurality of monomeric units comprising a monomeric unit comprising a pendent acid, a monomeric unit comprising an amine and combinations thereof;
wherein at least one of the polymeric linking agent or aminosilane is activated by the formaldehyde to provide an iminium ion.

6. A method according to claim 1, wherein the aminosilane is selected from the group consisting of N2-(aminoethyl)-3-aminopropyltrimethoxysilane, gamma-aminopropyltriethoxysilane, N-beta-(aminoethyl)-gamma-aminopropyl-trimethoxysilanes, aminoethyl-N-beta-(aminoethyl)-gamma-aminopropyl-trimethoxysilanes, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltrimethoxysilane, N-beta-(aminoethyl)-r-aminopropyltrimethoxy-silane, N-beta-(aminoethyl)-r-aminopropylmethyldimethoxysilane, r-aminopropyl-triethoxysilane, N-[3-(trimethoxysilyl)propyl]-ethylenediamine and combinations thereof.

7. A method according to claim 1, wherein the aminosilane is selected from the group consisting of (3-aminopropyl)trimethoxysilane, (3-aminopropyl)triethoxysilane, (3-aminopropyl)-diethoxy-methyl silane, (3-aminopropyl)-dimethyl-ethoxysilane, (3-glycidoxypropyl)-dimethyl-ethoxysilane, (3-mercaptopropyl)-trimethoxysilane, (3-mercaptopropyl)-methyl-dimethoxysilane, (3-glycidyloxypropyl)trimethoxysilane, $N^1$-(2-aminoethyl)-3-aminopropyltrimethoxysilane and combinations thereof.

8. A method according to claim 1, wherein the step of contacting the aminosilane with the sandstone reservoir to bond the silane functional group with sand particles is at a temperature greater than 50° C.

9. A method according to claim 1, wherein at least one of the polymeric linking agent or coupling agent is activated by the formaldehyde to form an iminium ion providing agglomeration via a Mannich reaction.

10. A method according to claim 9 comprising reacting the aminosilane with the formaldehyde to form the iminium ion and reacting the iminium ion with the polymeric linking agent to form a covalent bond.

11. A method according to claim 1, wherein the Mannich reaction further provides agglomeration as a result of intermolecular cross-linking between acrylamide monomer units of the polymeric linker.

12. A method according to claim 1, wherein the silane coupling agent is activated in situ in the sandstone reservoir.

13. A method according to claim 1, wherein the silane coupling agent is activated to provide an iminium ion of from 1 to 20 Mol % of the coupling agent.

14. A method according to claim 1, wherein the polymeric linking agent is a copolymer selected from the group consisting of polyacrylamide-poly(acrylic acid), polyacrylamide-poly(acrylic acid) sodium salt, poly(acrylic acid)-poly(maleic acid), polyvinyl alcohol-poly(acrylic acid), poly(ethylene oxide)-poly(acrylic acid), polyamine-poly(acrylic acid), polyethyleneimine-poly(acrylic acid), polyvinylpyrrolidone-poly(acrylic acid) and combinations thereof.

15. A method according to claim 1, wherein the polymeric linking agent is polyacrylamide-poly(acrylic acid).

16. A method according to claim 1, wherein the polymeric linking agent comprises from 20 wt % to 90 wt % acrylamide.

* * * * *